US006868110B2

(12) United States Patent
Phelts et al.

(10) Patent No.: US 6,868,110 B2
(45) Date of Patent: Mar. 15, 2005

(54) MULTIPATH AND TRACKING ERROR REDUCTION METHOD FOR SPREAD-SPECTRUM RECEIVERS

(75) Inventors: Robert Eric Phelts, Stanford, CA (US); Per Enge, Mountain View, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 759 days.

(21) Appl. No.: 09/728,949

(22) Filed: Dec. 1, 2000

(65) Prior Publication Data

US 2002/0101912 A1 Aug. 1, 2002

Related U.S. Application Data

(60) Provisional application No. 60/168,472, filed on Dec. 1, 1999.

(51) Int. Cl.[7] .............................. H04L 7/10; H04B 1/713
(52) U.S. Cl. ....................... 375/144; 375/149; 375/137; 375/150; 370/335
(58) Field of Search ................................ 375/132–150, 375/229, 343, 346; 342/357.06, 357.08; 370/335

(56) References Cited

U.S. PATENT DOCUMENTS 6,236,673 B1 * 5/2001 Julg ........................... 375/150

6,243,409 B1 * 6/2001 Fenton et al. ............... 375/137
6,252,863 B1 * 6/2001 Raby et al. .................. 370/335
6,493,378 B1 * 12/2002 Zhodzishsky et al. ...... 375/149

OTHER PUBLICATIONS

Bryan Townsend and Patrick Fenton,"A Practical Approach to the Rduction of Pseudorange Multipath Errors in a L1 GPS Receiver",Proceedings of ION GPS–94, 7th International Meeting, Salt Lake City, Sep. 20–20, 1994 pp143–148.*
P.G. Mattos, "Multipath Elimination for the Low–Cost Consumer GPS," *Proceedings of the 9th International Technical Meeting of the Satellite Division of the Institute of Navigation*, vol. 1, pp. 665–671, 1996.

* cited by examiner

Primary Examiner—Chieh M. Fan
Assistant Examiner—Edith Chang
(74) Attorney, Agent, or Firm—Lumen Intellectual Property Services, Inc.

(57) ABSTRACT

A multipath mitigation method consists of locating a multipath-invariant (MPI) point of an ideal autocorrelation function and measuring the distance between the MPI point and DLL. The same MPI point is located in a received correlation function, and the distance between the point and the DLL, now affected by multipath, is measured. The difference between the ideal distance and the actual distance is the code tracking error resulting from multipath. The error is subtracted from the computed pseudorange or used to control the DLL. The method can be used to reduce the effects of all types of tracking error sources, such as signal transmission failure or code noise.

45 Claims, 12 Drawing Sheets

MULTIPATH AND TRACKING ERROR REDUCTION METHOD FOR SPREAD-SPECTRUM RECEIVERS

CROSS-REFERENCE TO RELATED APPLICATIONS

This application claims the benefit of U.S. Provisional Application No. 60/168,472 filed Dec. 1, 1999, which is herein incorporated by reference.

STATEMENT REGARDING FEDERALLY SPONSORED RESEARCH OR DEVELOPMENT

This invention was supported in part by grant number 95-G-005 from the Federal Aviation Administration and the Department of Transportation (FAA/DOT). The U.S. Government has certain rights in the invention.

FIELD OF THE INVENTION

This invention relates generally to radio receivers. More particularly, it relates to techniques for reducing the effects of multipath in spread-spectrum radio communications systems, such as the Global Positioning System (GPS).

BACKGROUND ART

The Global Positioning System (GPS) is a U.S. government-supported system for precise position and velocity determination of objects. GPS is used in both military and civilian applications such as aircraft navigation and surveying. Orbiting satellites emit coded radio frequency signals that are received and processed by receivers on or near the surface of the earth to obtain pseudorange measurements, approximate instantaneous distances between the satellites and receiver. Because the satellite orbits and signal transmission times are known precisely, the receipt time of a particular signal bit can be used to quantify the transit time or range to the particular satellite. The orbits of the GPS satellites are arranged in multiple planes so that signals can be received from at least four satellites at any point on or near the earth, allowing precise position and velocity measurements of the receiver.

Each satellite continually transmits two spread-spectrum signals that are modulated by at least one of two pseudo-random noise (PRN) codes unique to the satellite. A receiver can therefore identify and separate signals from each satellite into separate channels, process the channel data separately, and combine the processed data to compute the receiver position. In addition to the PRN code, the signals are modulated by slower-varying data signals defining the satellite orbits and other relevant information needed for the computations. The two signal frequencies are in the L band and are referred to as L1 and L2. The L1 signal has a carrier frequency of 1575.42 MHz, usually expressed as $1540f_o$, where $f_o=1.023$ MHz. The L2 signal has a carrier frequency of 1227.6 MHz, or $1200f_o$.

The two PRN codes are known as the precise (P) code and the course/acquisition (C/A) code. The P code is available only to military and other authorized users, while the C/A code is available to all users for commercial and other civilian uses. The L1 signal is modulated by both the P and C/A codes, and the L2 signal by the P code only. The P code is spread over a bandwidth of 20.46 MHz and has a repetition frequency of one cycle per week. The C/A code, which contains 1023 bits, has a 1.023 MHz clock rate and a repetition frequency of 1 kHz. The remainder of this description focuses on the C/A code; however, analogous descriptions apply to the P code or any other PRN code.

In the receiver, local signals corresponding to the known PRN codes are generated and correlated with the received signals. The phases of the local signals are adjusted until the local signals correctly track the received signal. Since the time at which each bit of the code sequence is transmitted from the satellite is known, the time of receipt of each bit is a direct measure of the transmit time of the signal from the satellite to the receiver, and therefore a measure of the distance between the two. Based on the computed relative phase of the received signal, the receiver calculates the desired quantities of distance, velocity, etc.

In order to understand the context of the present invention, it is necessary to understand the method by which the receiver tracks the incoming code. The most common pseudorandom noise code is a binary sequence of 0's and 1's or −1's and +1's that modulates the carrier phase. The code sequence appears to be random, but in fact repeats identically at regular intervals. The C/A code consists of 1023 "chips," the length of time during which the code remains constant; the C/A chip period is therefore approximately 977.5 nanoseconds, equivalent to a distance of 293.05 meters. A portion 10 of a C/A code is shown in FIG. 1. In the receiver, a correlation function is formed between the actual received signal (after filtering) and a local replica. FIG. 1 illustrates the concept of the correlation function with code replicas 12a–12f and 14 that are offset from received code portion 10 by whole numbers of chips. Each chip period in which the received and replica value of the code are identical contributes $+\frac{1}{12}$ (the number of chips in this example) to the correlation function, and each chip with different values of the codes contributes $-\frac{1}{12}$. When the replica is directly lined up with the code, as is the final code replica 14 of FIG. 1, the correlation function has a value of 1. In all other offsets, as for replicas 12a–12f, the correlation function has a magnitude much less than 1. For longer sequences, the correlation function is much smaller in magnitude and is often considered to be effectively zero beyond an offset of one chip in either direction.

The bulk of the power in the correlation function occurs within a region between +1 and −1 chips offset from the received code signal. FIG. 2 shows a received code signal 16 and two offset replicas 18 and 20, along with a correlation function 22. The early 26 and late 28 arrows on function 22 correspond to code replicas 18 and 20, respectively. Clearly, offsetting replicas 18 and 20 from the received function by a value less than one chip decreases correlation function 22 from its maximum value of one, but still provides enough overlap for it to be significantly greater than zero. As a result, correlation function 22 has a triangular central portion 24 referred to as its main lobe. A standard delay-lock loop (DLL) uses a pair of correlators 26 and 28 that sample function 22 at early and late offsets from the peak 30. The goal of the DLL is to straddle the peak symmetrically so that peak 30 is exactly half-way between correlators 26 and 28. Practically, correlation function 22 is sampled at the early and late positions 26 and 28, and an early minus late value is obtained and used to control the offsets of the correlators. Peak 30 is considered to be located when the early minus late value is zero. If the early minus late value is positive, then the correlators are shifted earlier. Analogously, if the early minus late value is negative, then the correlators are shifted later.

A highly schematic view of a GPS receiver 31 is shown in FIG. 3. The RF front end of most conventional GPS receivers is analog. An incoming signal enters through an antenna 32 and is immediately amplified by a pre-amplifier. The signal is then cable-routed to a multi-stage downconversion process 34, during which a series of intermediate frequency mixers and filters converts the signal, nominally 20 MHz wide and centered at 1.545 GHz for L1, C/A code receivers, to baseband for correlation, tracking, and subsequent processing. A final intermediate frequency stage filter 36 sets the precorrelation bandwidth (PCB). Narrowband receivers have a PCB less than 2.5 MHz wide and pass only the main lobe of the C/A code power spectrum. Some implications of narrow PCB receivers are discussed below. The signal is then digitally sampled (38), and the values of the correlation function at the late (40) and early (42) correlators are determined. A processor 44 computes the early minus late error and determines the required adjustment to the correlators. A digitally-controlled (or numerically-controlled) oscillator (DCO) 46 adjusts the phase of the early 48 and late 50 code replicas until the code is correctly tracked.

This standard DLL implementation assumes a direct line of sight (LOS) between each satellite and the GPS receiver, i.e., that the relative time delay between signal transmission and reception is equal to the time for the signal to travel directly from the satellite to the receiver. In fact, most received signals are distorted by reflections of the transmitted signal from objects such as buildings and mountains or from the ground. Thus the received signal is a sum of the LOS signal and the so-called multipath (MP) signals. A highly schematic illustration of multipath is shown in FIG. 4. A signal transmitter 52, e.g., a satellite, transmits a signal that is received by a receiver 54. A line of sight signal 56 travels directly from transmitter 52 to receiver 54. Additionally, multipath signals 58 and 60 reflect from a mountain 62 and building 64, respectively, before arriving at receiver 54. While only two multipath signals are shown, there are typically many more multipath signals arriving at receiver 54. Multipath signals are always delayed relative to the LOS signal, because they necessarily travel a longer distance between the transmitter and receiver. As a result of the reflections, multipath signals typically also have lower amplitudes than LOS signals.

The effect of multipath on the DLL is illustrated schematically in FIG. 5. For clarity, only one multipath signal is shown. A multipath code 66 (dashed line) adds to a line-of-sight signal 68 (dotted line) to yield a total code signal 70 (solid line). Note that MP signal 66 is a delayed and lower-amplitude version of LOS signal 68 and therefore adds a delayed, lower-amplitude function 72 to the LOS correlation function 74. As a result, the peak shape of the total correlation function 76 is distorted, causing the correlators to converge to a location 78 that is offset from the line of sight peak 80. The difference between LOS peak 80 and the midpoint between the two correlators (often tracked with an additional "prompt" correlator) is the DLL tracking error 82 caused by multipath. The tracking error in the pseudorange measurement propagates to position, velocity, and other measurements, and is therefore highly detrimental to the accuracy of the system.

Multipath tracking errors are difficult to remove for a number of reasons. Multipath errors are not zero mean, particularly for large amplitude MP signals, so that even infinite smoothing of the computed pseudorange cannot guarantee unbiased position errors. In general, the pseudorange is a nonlinear function of multipath parameters such as amplitude, delay, and phase, which are not constant; changes in any one of these parameters can affect the DLL in unpredictable ways. Multipath errors are also particular to the location of the receiver, and thus errors at one receiver cannot be used to eliminate errors at a second receiver.

The multipath tracking error can be reduced somewhat by decreasing the spacing between the early and late correlators. Multipath effects occur primarily at the late slope of the main lobe, particularly for long-delay multipath. Thus while traditional DLL early and late correlators have spacings of one chip, many current receivers have correlator spacings of 0.5 chips or less. Decreasing the correlator spacing, however, cannot eliminate the fundamental effects of multipath. Furthermore, receivers with a narrow PCB flatten the correlation peak, and narrow correlator spacing has little effect on the tracking error in such receivers. FIG. 6 is a plot of theoretical tracking error as a function of multipath delay for two different correlator spacings, 0.1 and 1 chip, for a signal-to-multipath ratio of 3 dB and a 2 MHz precorrelation bandwidth.

A large number of techniques for eliminating or reducing multipath-induced tracking error have been developed. Current techniques can be grouped into two major categories, separation and estimation. Separation techniques essentially attempt to separate the LOS and MP signals and then track the LOS signal alone to eliminate the effects of multipath. Estimation techniques estimate the parameters of the LOS and MP signals to approximate their combined effect on the tracking error. All of these techniques require extra hardware for additional processing of the correlation function and often a wider bandwidth. Typically, additional correlators sample the peak at many locations to map out the complete curve. These methods are sensitive to changes in multipath parameters and have difficulty as the multipath parameters approach the line of sight parameters, i.e., at low multipath delays. Under these conditions, distinguishing LOS from multipath requires a very precise sampling of the function. Most multipath mitigation techniques therefore perform well against long-delay multipath, but for delays of below 30 meters, their performance degrades to that of a conventional, one-chip spacing DLL. Current techniques are also primarily effective only in wideband receivers. Receivers with narrow PCB generate correlation functions with flattened and rounded main lobes; even with relatively long multipath delays, distinguishing multipath from LOS is difficult in such receivers.

The E1–E2 Tracker technique is disclosed in P. G. Mattos, "Multipath Elimination for the Low-Cost Consumer GPS," *Proceedings of the 9$^{th}$ International Technical Meeting of the Satellite Division of the Institute of Navigation*, Vol. 1, pp. 665–671, 1996. In this method, an additional pair of correlators samples the main lobe of the correlation function at its earliest, relatively undelayed portions. The computed actual slope obtained from the correlators is compared with an ideal line of sight slope, and the difference is used to control the DLL correlators dynamically. This technique has a number of drawbacks. For accurate estimates of the slope, a maximum receiver precorrelation bandwidth is required. That is, it does not work well in narrow PCB receivers. It also performs best against medium- and long-delay multipath, and performs poorly under high noise conditions. Thus the E1–E2 Tracker method has similar drawbacks to other multipath mitigation techniques.

It would be a significant improvement in the art to provide a multipath mitigation technique that is effective in narrow PCB receivers. Narrowband receivers provide a number of advantages over wideband receivers. They are much less vulnerable to both narrowband interference and degradations or anomalies in the transmitted signals. It would also be an improvement to provide a multipath mitigation technique that operates independently of multipath parameters.

OBJECTS AND ADVANTAGES

Accordingly, it is a primary object of the present invention to provide a multipath mitigation technique that:
1) performs well in narrow precorrelation bandwidth receivers;
2) performs well with short-delay multipath;
3) operates independently of multipath parameters;
4) requires few changes to existing receiver hardware; and
5) can be implemented with very low additional cost.

It is an additional object of the present invention to provide a method for measuring a code tracking error generated by a spread-spectrum receiver tracking a coded signal.

SUMMARY

These objects and advantages are attained by a method for mitigating the effect of multipath signals on code or envelope tracking of a primary (line-of-sight) signal by a spread-spectrum receiver such as a Global Positioning System (GPS) receiver. The primary signal, typically the earliest arriving signal, is a carrier signal modulated by an envelope, and the receiver tracks the envelope. The receiver receives a signal that consists of the primary signal plus the multipath signals and attempts to track the signal in order to compute a pseudorange measurement between the receiver and a signal transmitter. The method has the following steps: in an ideal comparison (autocorrelation) function, locating an ideal multipath-invariant point, thereby determining an ideal distance between the ideal multipath-invariant point and an ideal multipath-dependent point; in an actual comparison (correlation) function computed from the received signal, locating a corresponding multipath-invariant point, thereby determining an actual distance between the corresponding multipath-invariant point and a corresponding multipath-dependent point; comparing the ideal and actual distances; and using this comparison to mitigate the effect of the multipath signals on envelope or code tracking of the primary signal. In one embodiment, the difference between the actual and ideal distances (the tracking error) is subtracted from the pseudorange measurement. In an alternative embodiment, the tracking error is used to control a signal tracking or delay-lock loop that tracks the received signal. The receiver typically also tracks a number of additional signals, and the tracking errors of all signals can be averaged to yield an average tracking error. The method preferably also includes a step of removing a bias in the tracking error.

Preferably, the ideal multipath-invariant point is in a plateau of the ideal autocorrelation function, and most preferably at an edge of the plateau. Practically, it is useful to select the multipath-invariant point at a location that is adjacent to the plateau but not within it. The multipath-dependent point is typically at one of the sampling locations of the signal tracking loop.

A multipath-invariant point in the actual correlation function is preferably found by bounding an interval in which the point is likely to occur, based on theoretical tracking errors and the ideal distance, and narrowing the interval until the point is located to a sufficient precision. If only a few samples (e.g., correlator observation or measurement points) of the multipath-invariant region are available, the interval is preferably narrowed according to a modified Fibonacci search. Preferably, the correlation function is sampled at a minimum of two locations, and a difference is formed between the two samples to obtain a discriminator value that is compared with a predetermined threshold value. Sample locations are adjusted until the discriminator value matches the threshold. Alternatively, a curve fit of the function is generated from the sampled points, and the multipath-invariant point is the point yielding a predetermined threshold value of the curve. The method can also locate more than one multipath invariant point, and the tracking errors obtained from all points can be averaged to obtain an average tracking error. Preferably, the effect of signal tracking loop dynamics is removed from the multipath sampling use a low-distortion component of the signal such as a carrier signal. Also, the correlation function is preferably normalized or calibrated before the multipath-invariant point is located.

The present invention also provides a method for measuring tracking error generated by a receiver that tracks a received signal modulated by an envelope. This method has steps similar to the multipath-mitigation method, but instead locates points that are invariant to signal distortion. The difference between the actual and ideal distances is the tracking error. For example, the tracking error can be caused by failure in signal transmission or by noise in the received signal. The measured tracking error can be used to improve performance of the receiver or to detect the presence of such failures of the signal transmission. The method can also include removing a bias in the tracking error, calibrating or normalizing the correlation function, or decoupling sample dynamics and noise from the distortion-invariant point location process using a low-distortion component of the signal such as a carrier signal.

DETAILED DESCRIPTION

Figure 1:
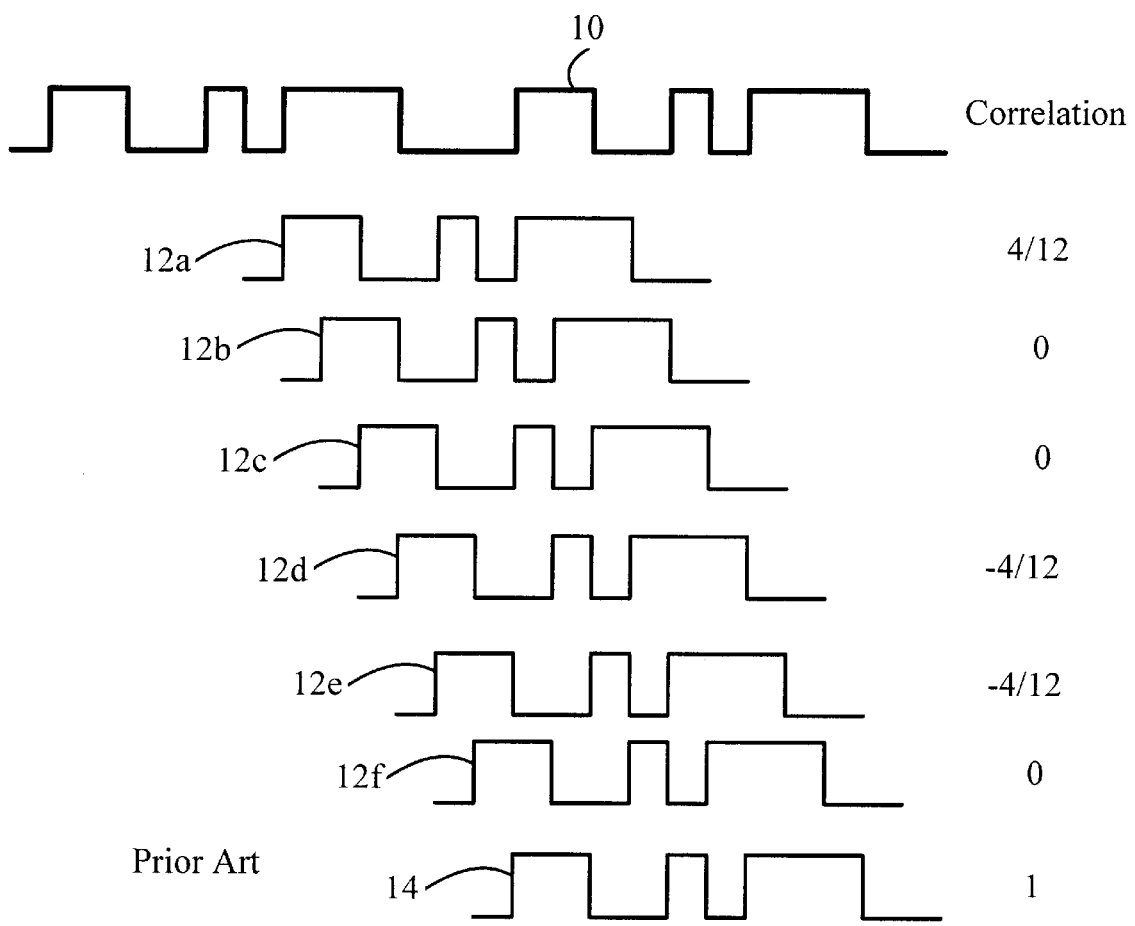
FIG. 1 (prior art) illustrates the computation of an autocorrelation function of a small code segment.
Figure 2:
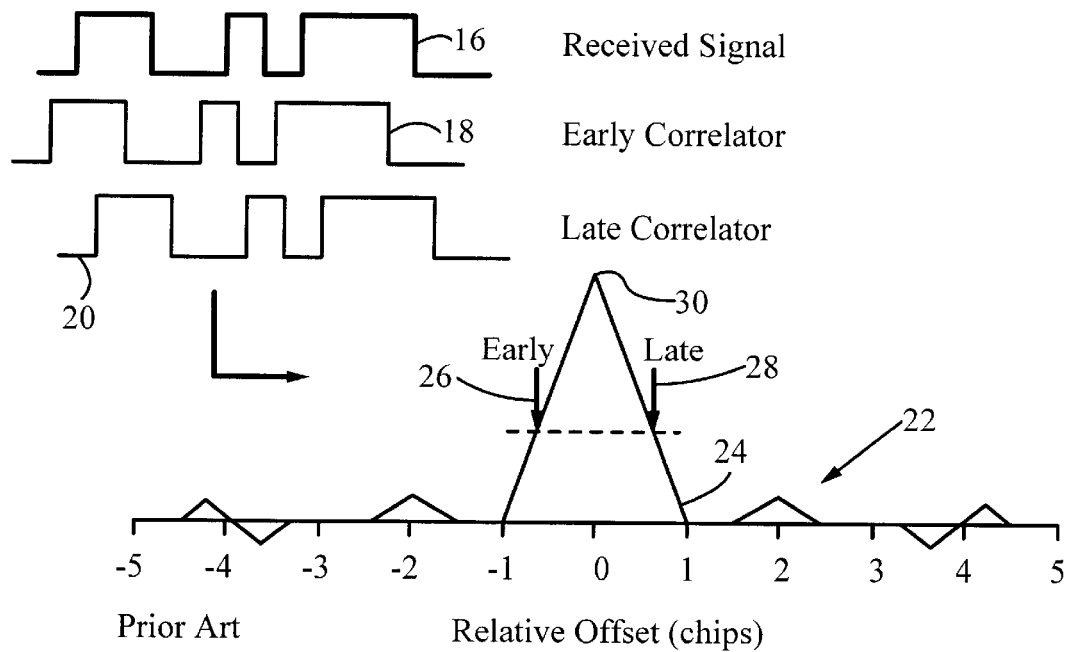
FIG. 2 (prior art) shows an ideal autocorrelation function with a pair of delay-lock loop correlators.
Figure 4:
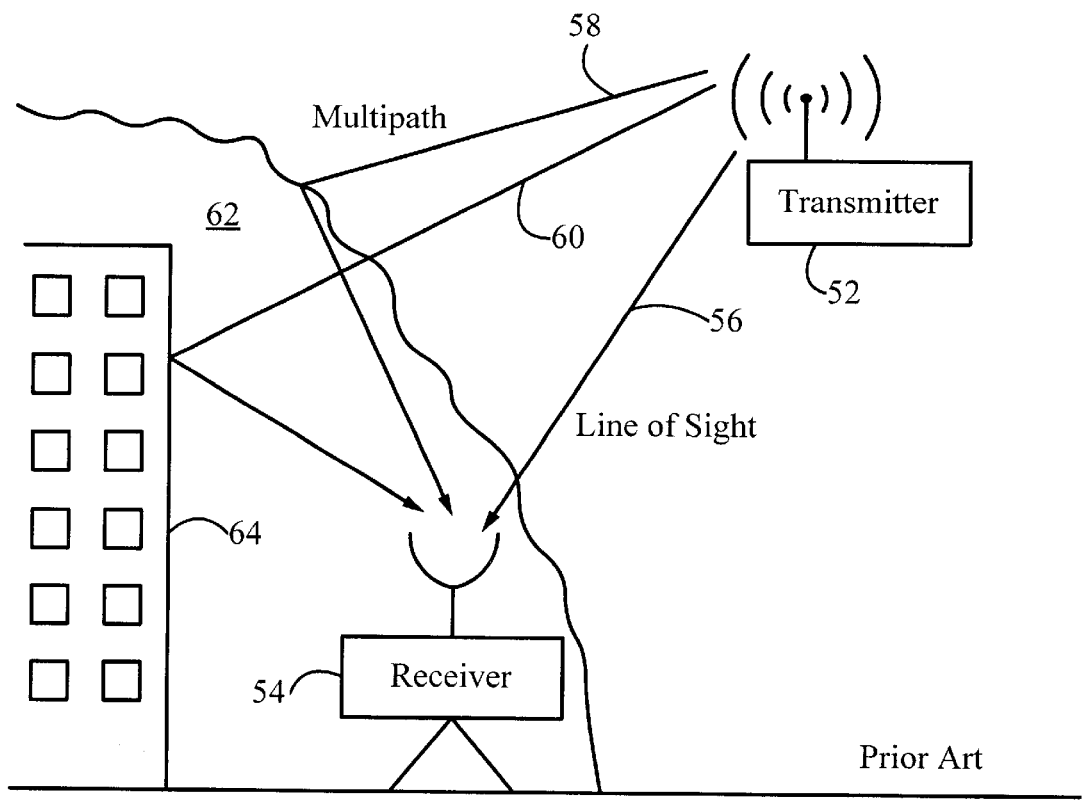
FIG. 4 (prior art) is a schematic illustration of line-of-sight and multipath signals arriving at a receiver.
Figure 3:
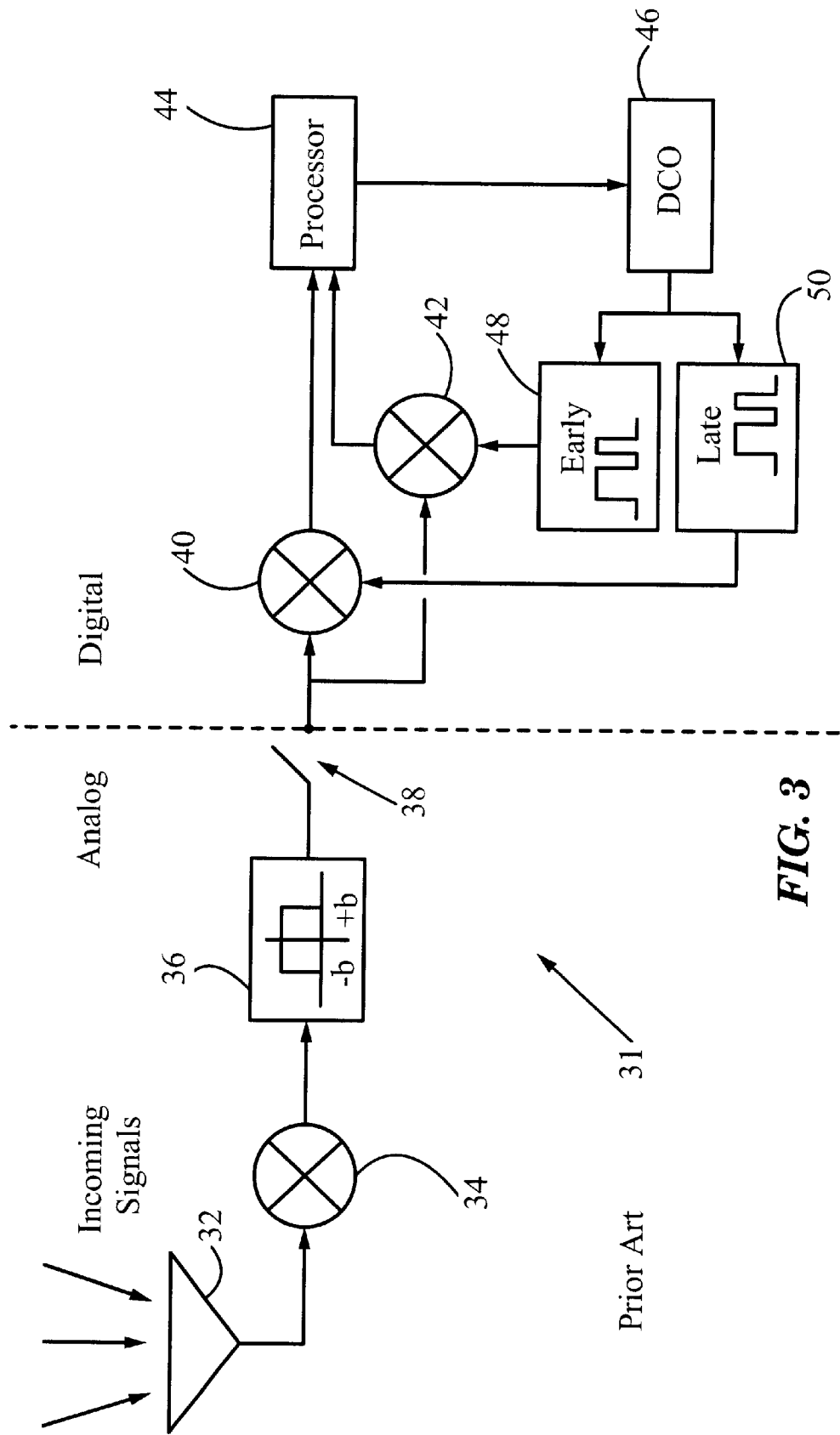
FIG. 3 (prior art) is a block diagram of part of a conventional GPS receiver.
Figure 5:
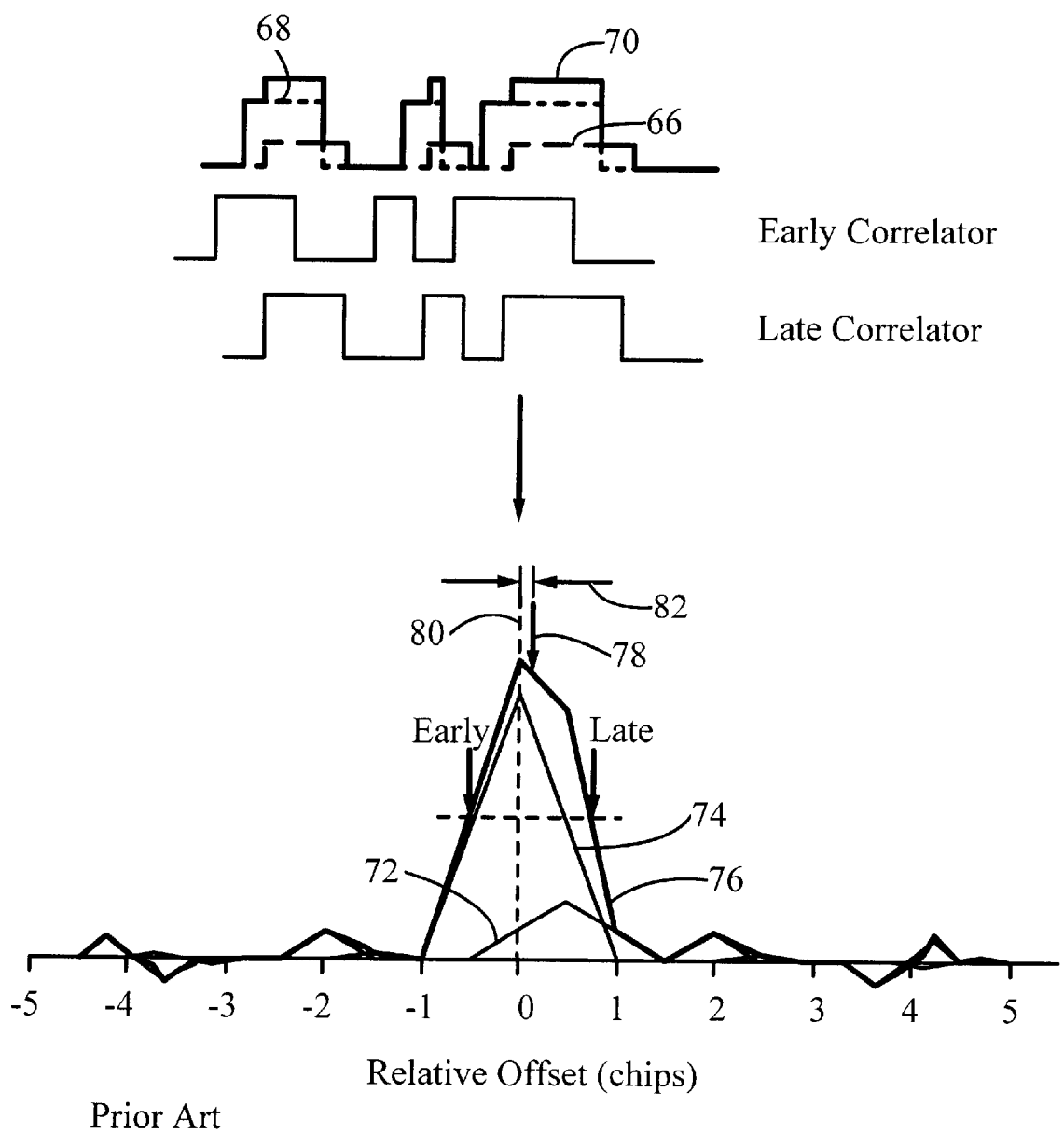
FIG. 5 (prior art) illustrates the effect of multipath on a correlation function of a received signal and on code tracking by a delay-lock loop.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

The present invention provides a novel technique for mitigating the effects of multipath signals on code tracking by spread-spectrum receivers. While the invention will be described with respect to Global Positioning System (GPS) receivers, it is to be understood that the principles can be applied to any wireless information transfer or communications systems (e.g., spread spectrum radio communications systems) in which tracking of a carrier signal whose amplitude or phase is modulated by an envelope is performed. In addition, while multipath mitigation is a key application of the invention, other applications benefit from the ability of the invention to discern the difference between an ideal, uncorrupted signal and a signal distorted by multipath, signal generator failure, or other sources. That is, the present invention can be used to identify and eliminate tracking errors originating from virtually any source.

In the following description, a number of specific terms are used to illustrate the invention. It is to be understood that these terms are purely illustrative, and that invention is not limited to such specific terms. The term "correlator" or "correlator pair" describes a receiver component responsible for sampling a correlation function at particular locations. These terms apply to conventional analog receivers. In all-digital (i.e., direct-sampling) receivers, however, the same function is performed by sampling the digital correlation function at chosen locations. It is to be understood that the use of the term "correlator" below applies both to analog correlators and to sampling the correlation function in digital receivers, and that its use does not limit the scope of the invention to any particular type of receiver.

A code is a specific example of an envelope that modulates the amplitude or phase of a carrier signal. In the context of the present invention, a receiver is tracking the envelope, and the invention detects and eliminates errors in envelope tracking. This process is typically referred to as code tracking. A delay-lock loop (DLL) is a specific receiver component that acquires and tracks an incoming signal. In the context of the present invention, the DLL tracks the envelope modulating a carrier signal. This function can be performed by any wireless communication or information transfer signal tracking loop, referred to herein as a "signal tracking loop." Any feedback signal control loop can be used, and it is to be understood that the term DLL does not limit the scope of the invention. As used herein, a primary signal refers to a signal that is tracked by a receiver in the presence of multipath or other distortions that cause tracking error. Typically, it is the earliest arriving signal at a receiver. The primary signal is referred to below as the line-of-sight (LOS) signal, but it is to be understood that the present invention improves tracking of any type of primary signal.

As used herein, the term "comparison function" refers to any function in which a specific type of multiplication is performed between two signals. In particular, at each possible offset of the two signals, corresponding samples of the two signals are multiplied, and then all such products are summed to obtain a comparison function value for that offset. In GPS receivers, the comparison function is referred to as a correlation function that is generated between a received signal and, for example, a local replica of the received signal. The term comparison function includes, but is not limited to, a matched filter operation, convolution, integrate-and-dump accumulator, and envelope detector.

As described above, it is generally assumed that the value of a pseudo-random noise (PRN) code correlation function is effectively zero outside of the main peak. However, the PRN codes are not strictly orthogonal. That is, the correlation function is not identically zero away from the main lobe. The present invention arises from the insight that side lobes of the correlation function have valuable information that can be used to verify the accuracy of the delay-lock loop. While the main lobe is almost always affected by multipath, there exist regions of the correlation function, which may lie away from the main lobe, whose properties are not affected by multipath. If these regions can be located reproducibly, regardless of multipath effects, then they can be used to correct the tracking error in the delay-lock loop caused by multipath. It is commonly believed that the signal power outside of the main lobe is much too low to provide useful information. The present invention, however, has been shown to extract useful information from the side lobes and use this information to eliminate or reduce multipath-induced tracking error.

Locations of the correlation function whose properties, when sampled and averaged over a sufficient length of time, are independent of multipath parameters such as amplitude, phase, and delay are called multipath-invariant (MPI) regions or points. Each PRN code has a unique set of multipath-invariant points. One useful multipath-invariant property is the slope of the correlation function. For illustration purposes, the invention is described below in the context of this property.

Figure 7A:
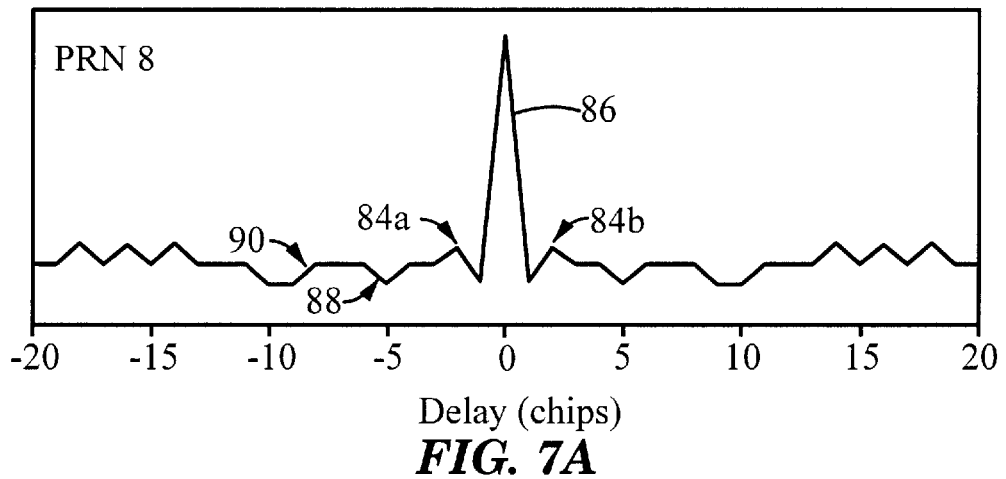
FIGS. 7A and 7B are ideal autocorrelation functions for PRN 8 and 29, respectively.
Figure 7B:
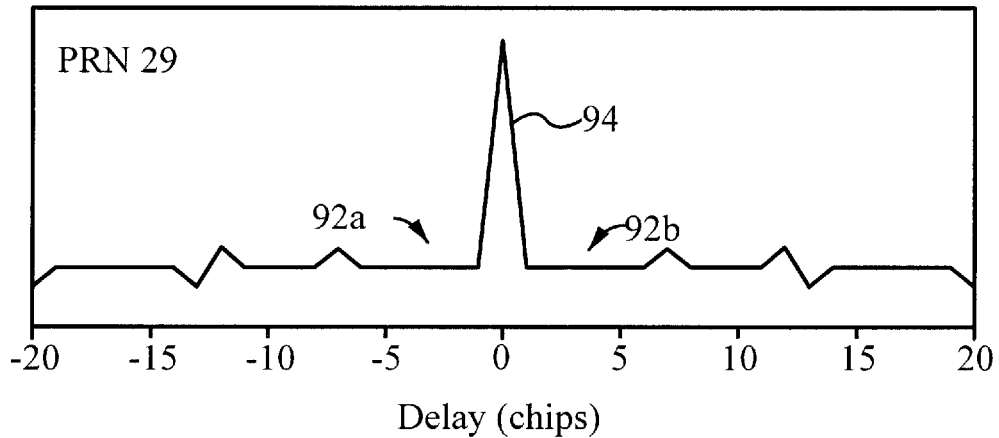

Multipath invariance is best understood by considering the two autocorrelation functions shown in FIGS. 7A and 7B for PRN 8 and PRN 29, respectively. (Recall that each GPS satellite transmits signals modulated by a unique and uniquely-numbered PRN code.) The autocorrelation function for PRN 8 contains side lobes 84*a* and 84*b* that are adjacent to a main lobe 86. Delay-lock loops (DLLs) tracking PRN 8 have one of the worst multipath performances, because side lobe 84*a* overlaps main peak 86 even for relative multipath delays of as high as 3.5 chips. Conventionally, it is assumed that the tracking error is zero for relative multipath delays greater than 1.5 chips, because the main lobe of the multipath signal no longer interferes with the main lobe of the line of sight signal. In the case of PRN 8, however, side lobe 84*a* interferes with DLL tracking just as a small replica of the main peak would, even if the main peak itself does not interfere. PRN 29, in contrast, has long plateaus 92*a* and 92*b* immediately adjacent to the main lobe 94. In this case, multipath delays of greater than 1.5 chips have virtually no effect on DLL tracking, regardless of the amplitude, phase, and phase rate characteristics of the multipath.

In fact, if it were possible to track a side lobe 88 of PRN 8 located at −5 chips (5 chips before the main peak), side lobe 88 would display the multipath tracking error characteristic of peak 94 of PRN 29, i.e., virtually no tracking error. Multipath signals with relative delays of greater than 1.5 chips but less than the distance between side lobe 88 and its adjacent side lobe 90 have no effect on the slope of side lobe 88 (although minor changes in amplitude do occur). In general, regions of a correlation function that are not affected by multipath delays of up to some large number of chips can be considered to be multipath invariant.

Figure 8:
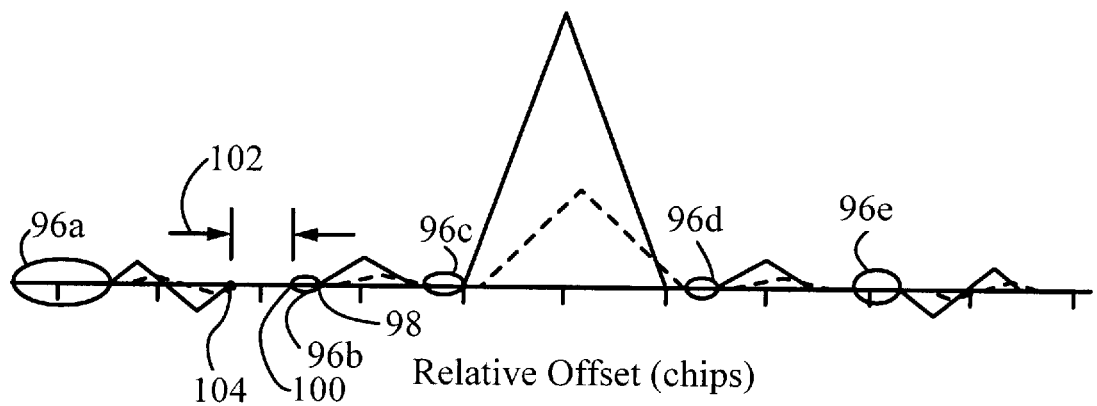
FIG. 8 shows multipath-invariant regions of an ideal autocorrelation function.

Furthermore, locating these regions, at least theoretically, is relatively straightforward. FIG. 8 shows a generic correlation function with multipath-invariant regions 96a–96e indicated. Multipath regions 96a–96e are plateaus in the correlation function, i.e., regions with essentially zero slope. Superimposing a zero-slope multipath component onto a zero-slope line-of-sight component changes the amplitude, but not the slope, of the overall signal. In particular, regions 96a–96e are at the early part of the plateaus. For example, region 96b begins (i.e., on the right) at a point 98 with a discontinuous slope (between zero and non-zero slope regions) and extends until a point 100 a fixed distance 102 away from a later point 104 of discontinuous slope. Fixed distance 102 can be selected based on an expected or reasonable multipath delay. The selection of distance 102 assumes that the multipath signal will not be delayed so much that the lobe beginning with point 104 interferes with region 96b.

Practically, it is necessary not just to locate a multipath-invariant region, but to locate one (or more) multipath-invariant point. For example, the simplest such point to locate that is within MPI region 96b is point 98. In general, reproducibly locatable MPI points occur at the corners or slope transition points alongside the early slopes of the side and main lobes, i.e., at the edges of the plateaus. Multipath-invariant points are selected by generating an ideal autocorrelation function for each PRN code and identifying plateaus within the function that are longer than a selected value. For example, it is reasonable to assume that multipath having relative delays (i.e., relative to the LOS signal, not relative to the satellite transmission) of at least three chips, approximately 880 meters, are either highly unlikely or have extremely low mean signal-to-noise ratios, compared with signal-to-noise ratios of the LOS main and side lobes. This assumption is particularly valid when the receiver and reflector geometry is changing, i.e., when the receiver or reflector is moving, but is also valid for large distances between the reflector and receiver, when higher frequencies have a more substantial decrease in amplitude. Both factors tend to "whiten" the MP interference, bringing it closer to zero mean and therefore easier to filter.

Table 1 lists optimal multipath-invariant point locations, relative to the peak of the main lobe, and widths of the corresponding plateau for each GPS Gold Code PRN. Only 17 of the codes have multipath-invariant plateaus adjacent to the main lobe. Most multipath-invariant plateaus have a normalized plateau height of $-1/1023$, but they also occur atop trapezoidal side lobes. The minimum width of the optimal MPI plateau for all codes is ten chips wide (for PRN 20).

TABLE 1

| PRN | Code Offset of MPI Point from Main Peak (± chips) | MPI Plateau Width (chips) | PRN | Code Offset of MPI Point from Main Peak (± chips) | MPI Plateau Width (chips) |
|---|---|---|---|---|---|
| 1 | 326 | 23 | 17 | 137 | 22 |
| 2 | 396 | 16 | 18 | 57 | 19 |
| 3 | 316 | 21 | 19 | 233 | 11 |
| 4 | 79 | 14 | 20 | 476 | 10 |
| 5 | 469 | 14 | 21 | 66 | 13 |
| 6 | 416 | 12 | 22 | 450 | 11 |
| 7 | 369 | 19 | 23 | 107 | 15 |
| 8 | 373 | 15 | 24 | 139 | 13 |
| 9 | 253 | 12 | 25 | 162 | 17 |
| 10 | 45 | 19 | 26 | 454 | 11 |
| 11 | 218 | 21 | 27 | 329 | 13 |
| 12 | 445 | 11 | 28 | 312 | 15 |
| 13 | 227 | 27 | 29 | 134 | 11 |
| 14 | 338 | 14 | 30 | 263 | 15 |
| 15 | 407 | 18 | 31 | 299 | 11 |
| 16 | 395 | 26 | 32 | 33 | 23 |

Figure 9:
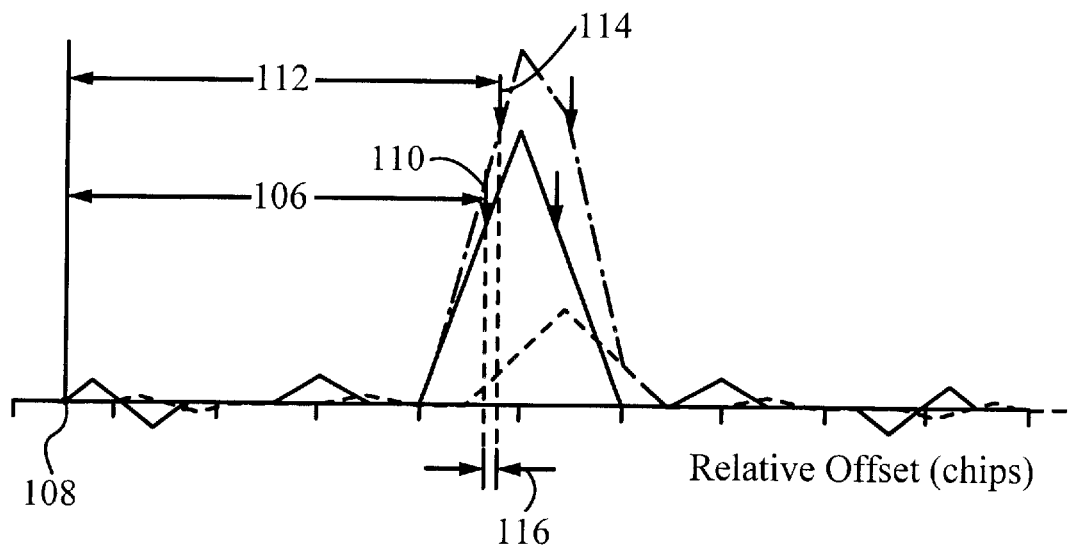
FIG. 9 illustrates a method of the present invention for eliminating multipath tracking error.

A multipath-invariant point is used as shown in FIG. 9 to mitigate the effects of multipath on the line-of-sight code tracking performance of the delay-lock loop of the receiver. An ideal distance 106 between a selected multipath-invariant point 108 and, for example, the early correlator 110 of the delay-lock loop is measured on an ideal autocorrelation function generated from the PRN code. Ideal distance 106 is the expected distance for a strictly line-of-sight signal, i.e., one that does not include multipath signals (or other significant error sources). In the receiver, an additional correlator pair locates the corresponding multipath-invariant point in the received correlation function. Within a reasonable error, which depends on receiver bandwidth, the corresponding point in the received signal is assumed to be at the same location, relative to the LOS peak, as the ideal multipath-invariant point in the ideal autocorrelation function. An actual or measured distance 112 between the MPI point and the actual location of the early correlator 114 is then found. The difference between ideal distance 106 and actual distance 112 is the multipath tracking error 116.

Note that because the DLL correlator spacing is constant, distances 106 and 112 can be measured from either of the two correlators. They can also be measured from the prompt correlator at the inferred peak. However, the distances must be measured from an MPI point to a point that is multipath dependent, i.e., a point whose location indicates the performance of the DLL tracking in the presence of multipath. This point is referred to herein as a multipath-dependent point. Of course, ignoring receiver finite bandwidth effects, the ideal and corresponding actual MPI points are at essentially the same location relative to the LOS peak, while the ideal and corresponding actual multipath-dependent points are not at the same location relative to the LOS peak.

A method according to the invention for using the MPI points to improve line-of-sight code tracking has the following assumptions:

1. For an individual signal, the relative distance between the main lobe and side lobes remains constant. That is, the C/A code can be delayed as a whole (e.g., by the ionosphere), but the chip length remains constant.
2. The receiver identifies the PRN codes before beginning the MPI search, and therefore searches for a known MPI point.
3. The only interference sources present are thermal noise, multipath, and cross-correlation noise due to the presence of other visible GPS satellites.
4. The relative positions of receiver correlators are controlled by software.

Figure 10:
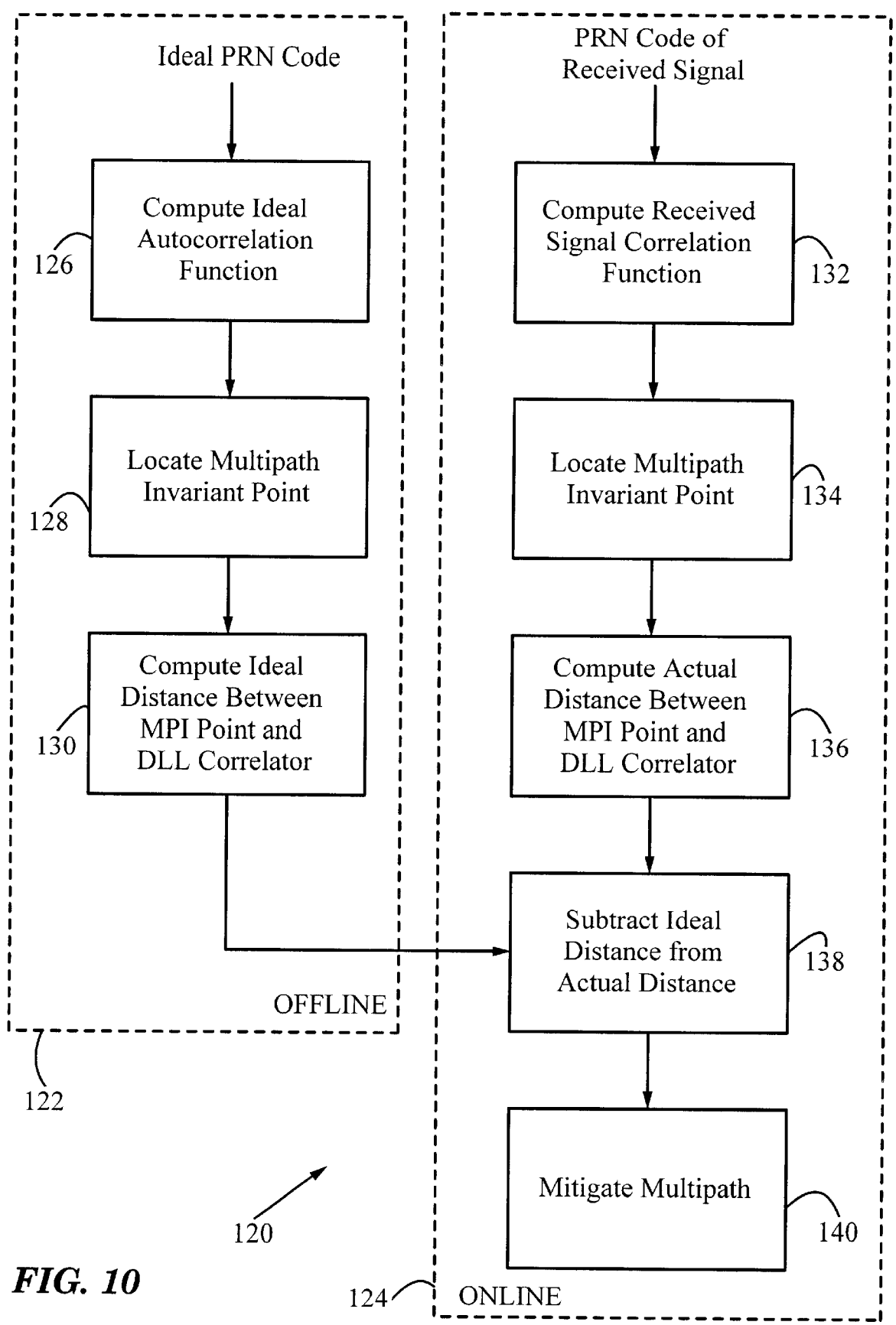
FIG. 10 is a flow diagram of a method of the present invention for eliminating multipath tracking error.

FIG. 10 is a flow diagram of a method 120 of the invention for mitigating the effects of multipath on code tracking of a line-of-sight signal. Method 120 is performed for each receiver channel, i.e., for each PRN code. The method has an offline portion 122 and an online portion 124. Offline portion 122 computes ideal distance 106 (FIG. 9), while online portion 124 computes actual distance 112 based on the received signal. While the method is illustrated as requiring both portions, offline portion 122 is typically performed only once for each receiver channel (or PRN code). The value of the ideal distance is stored, for example, in a lookup table, and then used by online portion 124 to determine and mitigate the effect of multipath on tracking of the newly received signal. Thus online portion 124 is performed continually as signals are received.

Beginning with offline portion 122, in step 126, an ideal autocorrelation function is computed for the PRN code. For example, FIGS. 7A and 7B show ideal autocorrelation functions for PRN 8 and 29, respectively. Next, in step 128, the MPI point or points are located on the autocorrelation function. In the case described above, MPI points are located at the late end of zero-slope segments (plateaus) of the function that extend over three code chips. In general, many MPI points exist within a single autocorrelation function, and only the most preferred MPI points are selected. For example, MPI points are preferably selected from MPI regions with the longest plateaus. Such MPI points are valid for a much longer delay in multipath. As mentioned above, long-delay multipath with an amplitude above the noise floor is unlikely. For each selected MPI point, the ideal distance between the MPI point and a selected multipath-dependent point is measured (step 130) and stored for future reference. The multipath-dependent point is typically one of the DLL correlators. As shown in FIG. 9, the location of the early or late DLL correlator is one-half of the correlator spacing from the ideal autocorrelation peak.

Online portion 124 contains analogous steps for the received signal. In step 132, the actual correlation function between the received signal and the PRN code is computed. Note that the PRN code is identical to the PRN code used to generate the ideal autocorrelation function in step 126. In step 134, one or more multipath-invariant points is identified in the computed actual correlation function. The located point or points correspond to the points located in the ideal autocorrelation function in step 128. Step 134 can be implemented in many ways; a preferred implementation of step 134 is described in detail below. Next, in step 136, the actual distance between the MPI point and the actual multipath-dependent point is measured. The actual multipath-dependent point must correspond to the multipath-dependent point used in step 130. In step 138, the difference between the actual distance and the ideal distance is computed. This difference, the multipath tracking error, is used in step 140 to mitigate the effects of multipath on code tracking of the line of sight signal by the DLL. Step 140 can also be implemented in a variety of ways.

A simple implementation of step 140 is to subtract the multipath tracking error from the results of the DLL, i.e., from the computed pseudorange to the particular satellite.

A more complicated implementation uses the computed tracking error to control the positions of the DLL correlators. Use of the MPI-based multipath corrections to adjust the DCO of the DLL may reduce the maximum tracking excursions of the DLL due to multipath or thermal noise. Accordingly, it may help further reduce the maximum expected tracking errors. For example, under conditions of significant interference, the DLL correlators can be translated so far from the LOS peak that they are unlikely to be able to return to the correct position to track the peak. Knowing approximate bounds on the distance between the MPI point and the LOS correlation peak allows for maintaining the correlators within a reasonable distance from the peak.

Note that the present invention can detect and eliminate multipath error introduced by arbitrarily small multipath delays, even below 25 m. This is because the ability to locate a multipath-invariant point is independent of multipath parameters such as delay. At such small relative multipath delays, most existing wideband techniques have difficulty separating the multipath and line-of-sight main lobes and, therefore, perform only as well as narrowband techniques.

One of the most challenging aspects of implementing the present invention accurately is locating the multipath-invariant point reproducibly. In general, the signal strength is so low at the multipath-invariant point that the correlation function has a value that is on the order of the noise floor, and it is difficult to extract meaningful data from this part of the signal. The problem is particularly difficult in receivers with narrow precorrelation bandwidths (PCBs). In such receivers, the correlation function has much smoother slope transitions than in wider bandwidth receivers. For the above example, in which the multipath-invariant property is the slope of the correlation function, and the multipath-invariant point occurs at a slope transition, narrow PCB receiver present particular difficulties. However, because few existing multipath mitigation techniques are effective in these narrowband receivers, application of the present invention to these conditions is particularly desirable.

Figure 11:
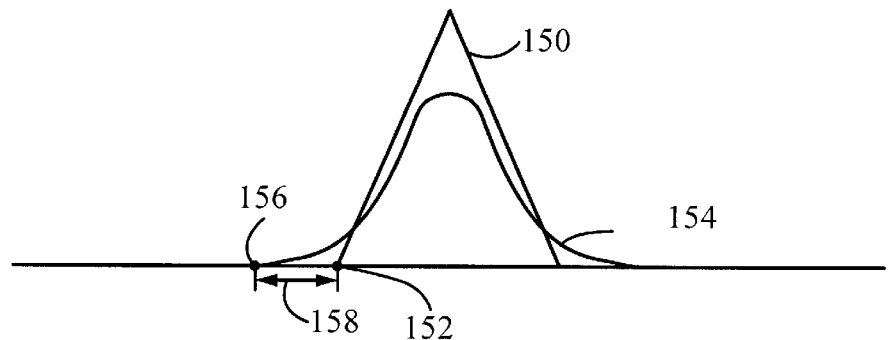
FIG. 11 illustrates the error introduced by narrow precorrelation bandwidth receivers in locating a multipath-invariant point.

FIG. 11 illustrates the difficulty caused by narrow PCB receivers in the method of the invention. A correlation function 150 generated by a receiver with infinite PCB has very sharp slope transitions, and the location of a multipath-invariant point 152 is easily distinguished. A correlation function 154 is generated by a receiver with a narrow PCB. Function 154 is much smoother than function 150. The multipath-invariant point in function 154 that corresponds to point 152 is much more difficult to locate. If the point is assumed to occur at a value of the correlation function that is equivalent to the value at point 152, i.e., at point 156, then an error of length 158 is introduced. It is important that the criterion for selecting the MPI point in the received correlation function minimizes error 158.

Figure 12:
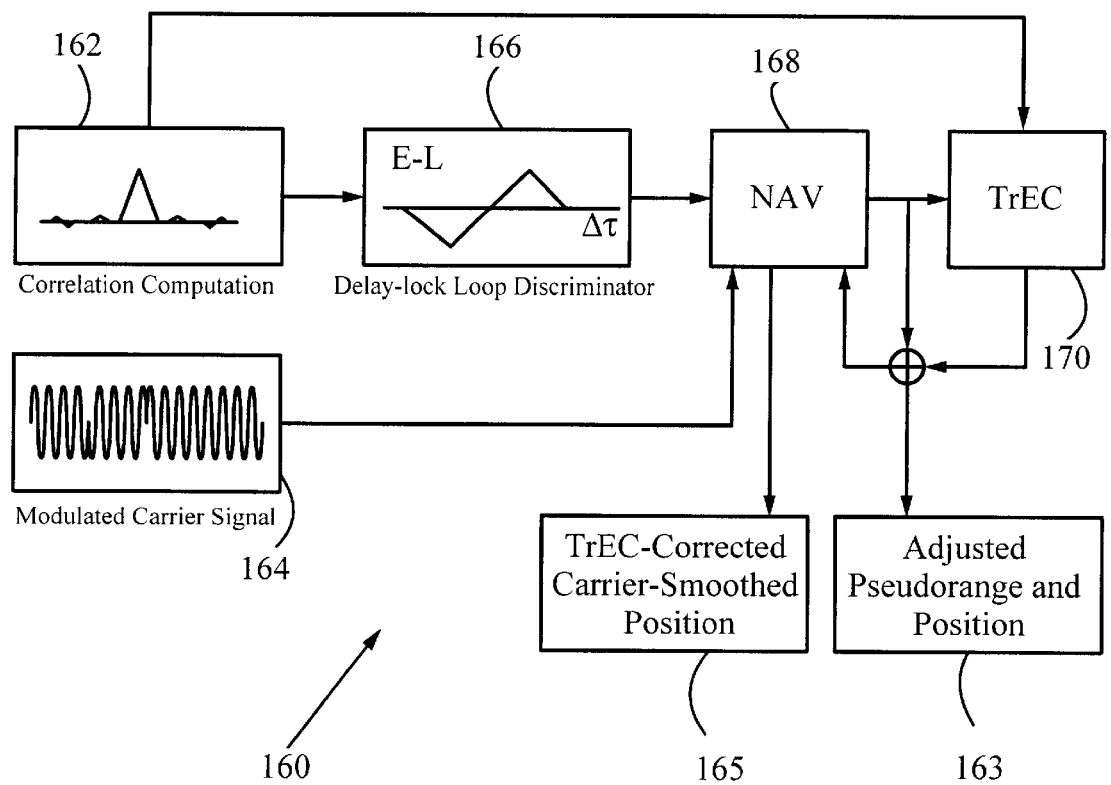
FIG. 12 is a block diagram of part of a receiver for implementing the present invention.

FIG. 12 is a block diagram of a system 160 for implementing multipath mitigation in one receiver channel according to the present invention. Module 162 implements the correlation function computation using the code extracted from a modulated carrier signal 164 and the ideal code signal for the particular receiver channel. Module 166 contains the delay-lock loop discriminator that tracks the received correlation function. As illustrated, the location of the DLL correlators is shifted until the difference between early and late samples of the correlation function is zero. The location of the tracked peak is passed to navigator module 168 that computes the pseudorange for this single channel and the position solution using pseudoranges from all channels. Module 170, which implements multipath mitigation according to the present invention, is known as the Tracking Error Compensator (TrEC). TrEC 170 has as input the code correlation functions 162 and the pseudorange solutions, which, combined with the ideal distance from the lookup table, can be used to bound the MPI search, as explained below. The tracking error value obtained from TrEC 170 is subtracted from the pseudorange solution to obtain corrected pseudoranges. The tracking error is also passed to navigation module 168, which computes the position solution and may also perform carrier smoothing of the pseudoranges. Carrier signals 164 may be used for carrier smoothing of the corrected pseudorange values. Carrier smoothing is a standard prior art technique for stabilizing computed position and pseudorange values and will not be discussed herein. Using the TrEC-corrected pseudoranges results in an MPI-corrected, carrier-smoothed position solution 165.

Figure 13:
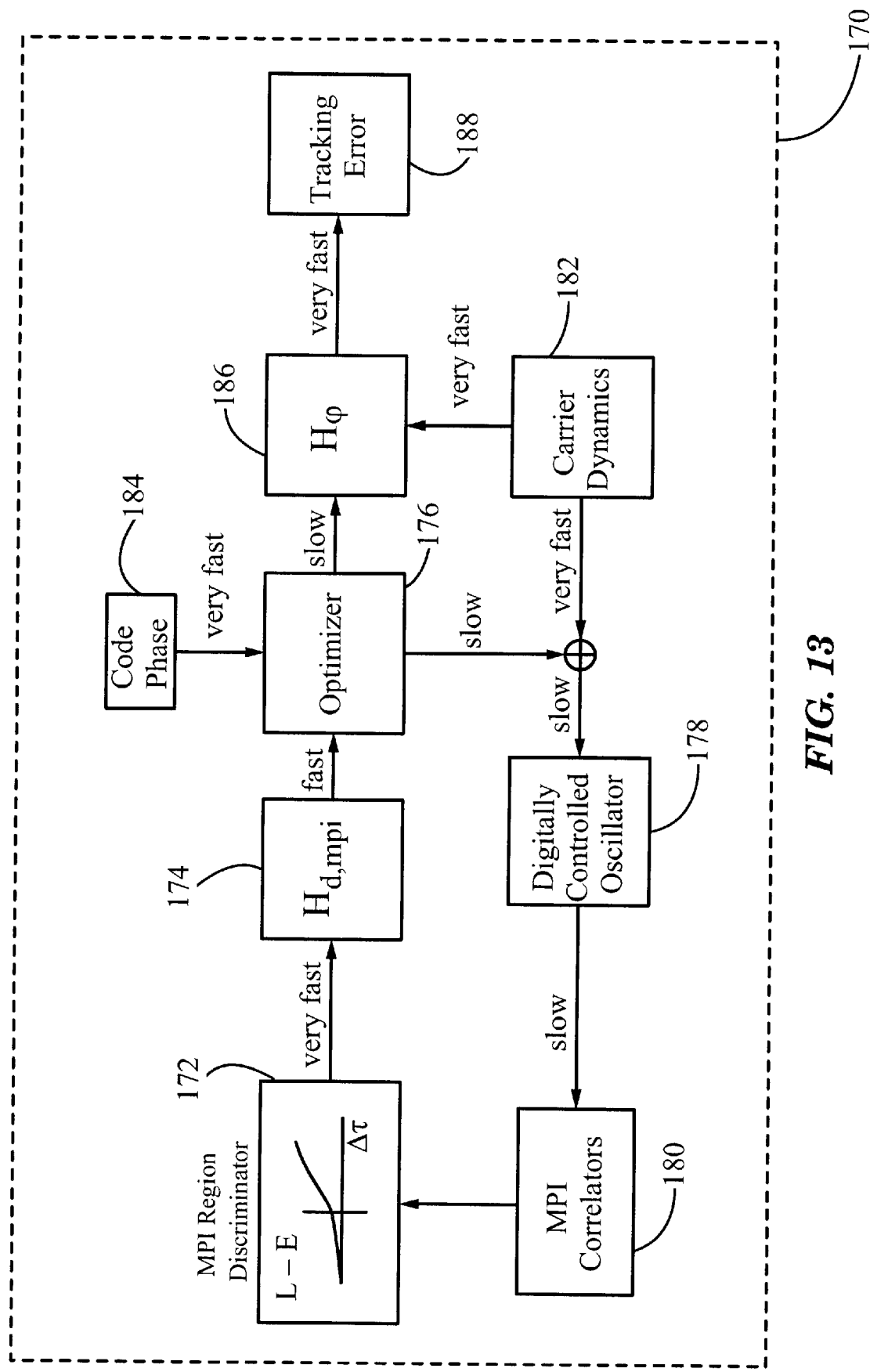
FIG. 13 is a block diagram of the Tracking Error Compensator (TrEC) of the receiver of FIG. 12.

The specific implementation of TrEC 170 depends upon the type of receiver used. For example, TrEC can be implemented in software in an existing low-end narrow PCB receiver. Obtaining accurate results is most difficult in such an implementation, because the correlation function does not have sharp peaks, and because limited sampling of the correlation function for locating the MPI point is permitted. However, this embodiment is relatively inexpensive to implement and may not require any additional hardware than is provided by conventional receivers. FIG. 13 is a block diagram illustrating the elements of TrEC module 170 of FIG. 12, according to a software-only embodiment of the method. TrEC module 170 computes the tracking error from the correlation function of the signal, given the results from the DLL.

Module 172 is an MPI region discriminator, which is described in more detail below. In the embodiment described below, the region of the correlation function likely to contain the MPI point is sampled at two points, and the difference between the two points is formed.

At each sampling, the value is passed to a filter $H_{d,mpi}$ 174 which time averages the samples. The correlation function sampling occurs very rapidly, at the rate at which correlation functions are generated for the DLL (e.g., 10 Hz). The time-averaged values from filter 174 are passed to an optimizer 176 that will also be described in more detail below. Briefly, optimizer 176 compares the received value to a threshold to determine whether the MPI has been correctly identified. If not, it determines how to shift the sample locations to approach the MPI point. The result of the determination is sent to a digitally controlled oscillator 178 that controls the location of the MPI correlators 180, i.e., the location of the MPI region at which samples are taken.

In TrEC 170, carrier dynamics 182 are used to decouple the multipath-varying code dynamics from the sampled points in the multipath-invariant region. The multipath-varying code dynamics are manifested in the movement of the DLL correlators. If the multipath region sampling is not decoupled from the code dynamics, then the location of the multipath correlators moves with the DLL correlators, which decreases the efficiency and accuracy of locating the multipath-invariant point. GPS receivers typically perform carrier aiding, in which the dynamics of the DLL are propagated from one update to the next using the difference in accumulated carrier phase measurements between two updates. Thermal noise and other error sources affect code phase measurements much more than carrier phase measurements, and so carrier aiding effectively smoothes code tracking errors. In this context, the carrier signal is referred to as a low-distortion component of the signal, while the code, from which the correlation function is generated, is a high-distortion component. In TrEC 170, carrier aiding enables the MPI correlator pair to maintain a code-phase offset relative to the DLL that is only carrier-phase dependent.

Note that while the carrier signal is the preferred low-distortion component that is used to decouple dynamics from the code signal, this function can be performed using any knowledge of the signal dynamics that is not subject to the errors affecting the code signal. For example, an inertial sensor such as an accelerometer, a separate reference signal, or a separate information source can be used.

Alternatively, if the distortion of the code dynamics is predictable, then the location of the multipath sampling can be adjusted based on the predicted code dynamics. In this case, the prediction is not a function of any measured signal dynamics.

When optimizer 176 determines that the MPI point has been located correctly, it computes the distance between the MPI point and some fixed point of the DLL, such as the early correlator or the prompt correlator, using the code phase measurements 184 obtained from the DLL. The tracking error value is passed to a filter $H_\phi$ 186 that smoothes the values over time using carrier phase dynamics 182. Filter 186 is needed because optimizer 176 makes decisions based on average values after a number of samples of the discriminator function. As a result, the converged estimate of the MPI point location contains some error, which can be reduced by filtering over time. Filter 186 is a closed loop estimation filter that propagates estimates at one time step to the estimate at the next time step using the integrated carrier phase. There is no latency associated with dynamic decoupling, and so the solutions can be used immediately to compensate for DLL tracking errors. Slow updates (e.g., well below 1 Hz) from optimizer 176 are blended with fast updates of carrier dynamics 182 (e.g., up to 1 kHz). A subsequent estimate of the MPI point is averaged with the integrated-carrier-phase-propagated previous solution using a Hatch filter with a time constant that can be relatively long, because the relative distance to the multipath-invariant point is constant. The measured tracking error 188 is then used to correct the pseudoranges.

Figure 14A:
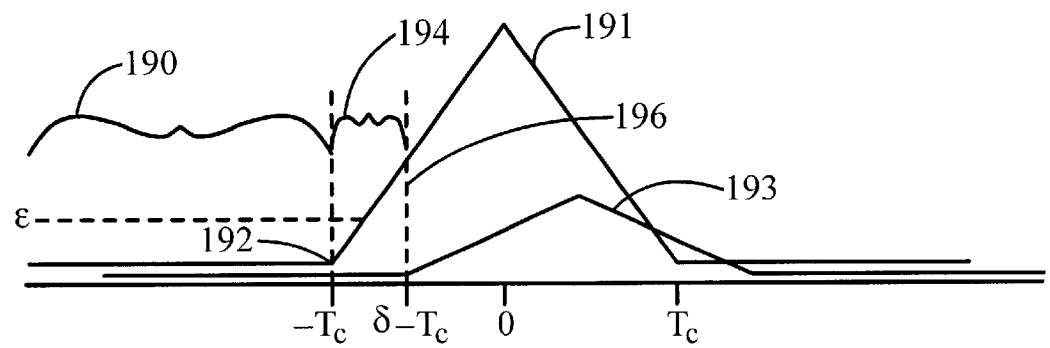
FIGS. 14A–14C illustrate details of one implementation of the method of FIG. 10.

In this embodiment, MPI region discriminator 172 is implemented using a single correlator pair; that is, the correlation function is sampled at two points that are typically a fixed distance apart. The goal of the single-correlator implementation of the MPI discriminator is to find a point at a particular threshold value of the correlation function. This threshold value defines the MPI point. FIG. 14A indicates a multipath-invariant region 190 of a correlation function containing line-of-sight 191 and multipath 193 contributions. In this and remaining figures, $\tau$ is the time relative to the line-of-sight peak, and $T_c$ is the chip length in time units. As described above, the preferred multipath-invariant point is located at the slope discontinuity 192. Of the points in multipath-invariant region 190, the point at location 192 is easiest to distinguish and remains multipath invariant over the longest multipath delay. In a narrow PCB receiver, the correlation function does not have sharp peaks but looks more like the curve of FIG. 14B. In this case, the equivalent multipath-invariant point 200 is located in a region of non-zero slope. In general, even if the correlation function has sharp corners, the multipath-invariant point is easiest to locate if it is considered to be a small distance up the side of the main lobe. This position is referred to as being adjacent to a plateau of the correlation function. Referring again to FIG. 14A, the point must be in a region 194 between the slope transition at location 192 and the beginning of the multipath peak at a location 196. Assuming that the multipath delay always has a value of at least $\delta$, region 194 is guaranteed to be multipath invariant, while any point to the right of location 196 is not multipath invariant. To minimize the assumed value of $\delta$, the location at which the multipath-invariant point is assumed to exist should be within region 194 and close to location 192. A value $\epsilon$ of the function within region 194 is selected as the threshold value used to locate the MPI point on the received correlation function.

Figure 14B:
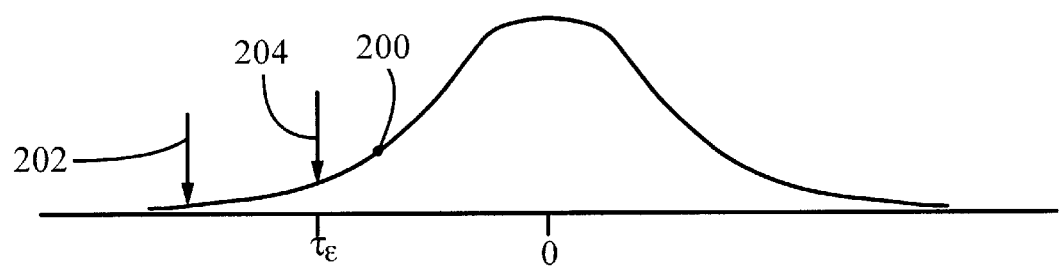

Note that it is the slope and not the amplitude that is multipath invariant. If a threshold value is to be used to identify the multipath-invariant point, it is important to remove the effects of multipath on the correlation function amplitude, so that only the slope is effectively being measured. This is done by forming a difference between the correlation function value at two locations, e.g., an early correlator 202 and a late correlator 204, as illustrated in FIG. 14B.

The difference between the sampled value at correlator locations 202 and 204 is referred to as a discriminator function, which is then compared with the predefined threshold value. Assuming that the multipath-invariant region contains no line-of-sight side lobes, the value of the total correlation function $\overline{s_1(t)s_2(t)}$ at point 202 (early) is:

$$\overline{s_1(t)s_2(t)} = b_o + \beta(\alpha_i, \theta_i, \omega_i),$$

where $b_o$ is a noise-level constant value and $\beta$ is the multipath contribution, which is a function of multipath amplitude, phase, and relative frequency. The value of the total correlation function at point 204 (late) is:

$$\overline{s_1(t)s_2(t)} = R(\tau - \tau_e) + b_o + \beta(\alpha_i, \theta_i, \omega_i),$$

where $R(\tau - \tau_e)$ is the LOS contribution from the main lobe at a point $\tau_e$. Note that points 202 and 204 are within the multipath-invariant region. They may have a multipath component, but, by definition, the multipath component is constant in this region, i.e., independent of multipath parameters. Thus the $\beta$ terms at the two locations are identical, and the difference between the correlation function at the two points is simply given by $R(\tau - \tau_e)$; the constant value $b_o$ and the multipath contributions cancel. The discriminator function therefore indicates how far up the line-of-sight main lobe late correlator 204 is. This quantity is exactly what is required to locate the multipath-invariant point at the chosen threshold value. To implement this embodiment, a threshold value is selected for the difference between late 204 and early 202 correlators, and the correlator position is adjusted until the discriminator value is equal to the threshold value, within an allowed tolerance.

In FIG. 13, filter 174 time averages discriminator values. Optimizer 176 determines, based on the difference between the discriminator value and the predetermined threshold $\epsilon$, in which direction and by how much to move the correlator pair so that the late correlator is positioned at the multipath-invariant point. Preferably, optimizer 176 is implemented using a Fibonacci search. A Fibonacci search is an algorithm for locating the minimum (or maximum) of a function within a predefined interval of length I. Similar to a binary search, a Fibonacci search continually narrows the interval until the desired point is located to within a given tolerance. In subsequent iterations, the interval bounds and test points within the interval are adjusted according to a Fibonacci sequence, in which $F_1 = F_2 = 1$ and $F_n = F_{n-1} + F_{n-2}$. For a discrete interval, the number of iterations is set by the number of points within the original interval. For a continuous interval, the number of iterations is set by the desired precision, i.e., the size of the final interval. The final interval size is given by $I/F_n$, where n is the number of iterations. A typical Fibonacci search to minimize a function f(x) within an interval $[b_1, b_u]$ proceeds as follows:

Initialization:

$$x_1 = b_1 + (1 - F_{n-1}/F_n)(b_u - b_1)$$

$$x_2 = b_1 + F_{n-1}/F_n(b_u - b_1)$$

$j^{th}$ Iteration:

if $f(x_1) \leq f(x_2)$:

$b_u = x_2$ $x_2 = x_1$ $x_1 = (b_u - F_{n-j-1}/F_{n-j})(x_2 - b_1)$ if $f(x_1) > f(x_2)$:

$b_1 = x_1$ $x_1 = x_2$ $x_2 = b_1 + F_{n-j-1}/F_{n-j}(b_u - x_1)$

The iterations are repeated through the j=n−1 iteration. The solution is located within the final interval, i.e., between $b_1$ and $b_u$.

A Fibonacci search has a number of properties that make it suitable for locating the multipath-invariant point. Because it uses the Fibonacci ratio to reduce the interval, rather than halving the interval as a binary search does, it is a very efficient, non-gradient search for a large initial uncertainty. It is also well suited for constrained (bounded) uncertainty intervals and functions that are costly to evaluate or observe. Each additional iteration of sampling the correlation function increases the initialization time to locate the multipath-invariant point, and so a method that rapidly zeroes in on the point is highly desirable.

In this embodiment of the method, a standard Fibonacci search (FS) is adapted to the search for the multipath-invariant point. Rather than searching for a minimum of a function in a fixed interval, the search is for a point yielding a particular value, the threshold $\epsilon$, of the discriminator function within a fixed interval. The discriminator function has a value of Late−Early, where Late and Early are the correlation function samples at points $\tau_{mpi}$ and $(\tau_{mpi} - d_{early})$, respectively, and where $\tau_{mpi}$ is the offset from the main peak at which the late correlator is sampled and $d_{early}$ is the time difference between the two correlator locations.

The other significant difference between the MPI point search and a standard Fibonacci search is that the correlation function is dynamic. The dynamics are removed as described above. Because evaluations of the correlation function are averaged over a period of time, the correlator pair maintains a fixed code offset during averaging.

The FS is initialized with an initial guess at $\tau_{mpi}$. Initially, the location of the MPI point relative to this guess is unknown. All subsequent FS updates (i.e., decisions and movements) are made relative to this position. Again, all dynamics are removed at each step using carrier phase propagation. Each decision narrows the interval until a final estimate of $\tau_{mpi}$ is made. This final estimate is then stored and propagated in time using the carrier phase. Independently, the FS is repeated and a second guess of the MPI point location ($\tau_{mpi}$) is made. This guess is averaged (filtered using $H_\phi$) with the first to produce an improved estimate. The improved estimate is then propagated forward and the process is repeated. The result of the search is a value of the late correlator offset from the main line of sight peak, $\tau_{mpi}$, that yields a discriminator value of $\epsilon$, the chosen threshold. This point is defined to be the multipath-invariant point.

To find the multipath-invariant point, the steps are as follows:

Initialization:

$$\tau_{mpi} = b_1 + (1 - F_{n-1}/F_n)(b_u - b_1)$$

$j^{th}$ Iteration:

if Late($\tau_{mpi}$)−Early($\tau_{mpi}-d_{early}$)≦ε: (multipath-invariant point to the right)

$b_l = \tau_{mpi}$ $\tau_{mpi} = b_1 + F_{n-j-1}/F_{n-j}(b_u - \tau_{mpi})$ if Late($\tau_{mpi}$)−Early($\tau_{mpi}-d_{early}$)>ε: (multipath-invariant point to the left)

$b_r = \tau_{mpi}$ $\tau_{mpi} = (b_u - F_{n-j-1}/F_{n-j})(\tau_{mpi} - b_1)$

The iterations are repeated through the j=n−1 iteration. The multipath-invariant point is located within the final interval, i.e., between $b_u$ and $b_1$. For example, for a narrow-band receiver with a DLL correlator spacing of 0.5 chips, I=±60 meters yields $F_n$=144. This implies 11 evaluations and final interval size ≦1 meter. The first Fibonacci search has a relatively large initial interval, but subsequent iterations will preferably have smaller initial intervals.

Figure 6:
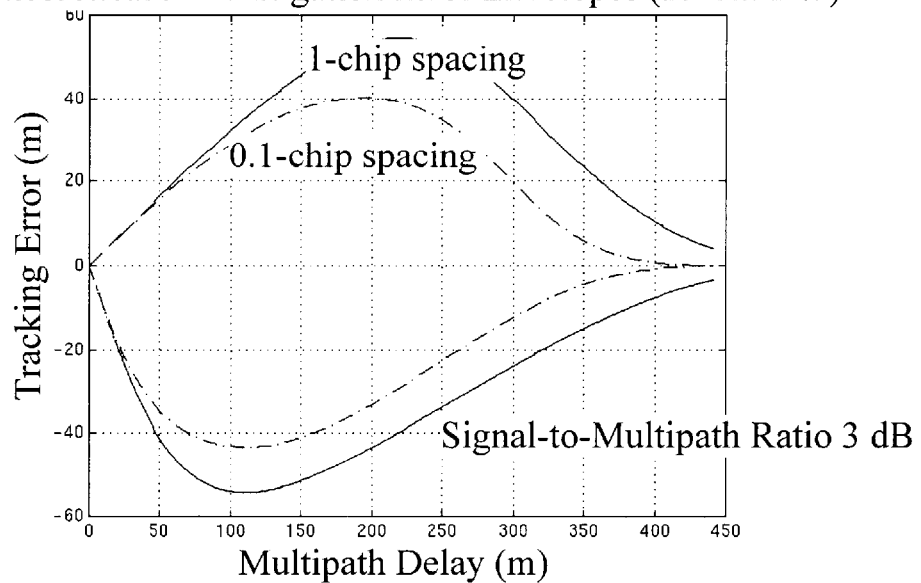
FIG. 6 (prior art) is a plot of tracking error versus multipath delay for a conventional narrow precorrelation bandwidth GPS receiver, for two different correlator spacings.
Figure 14C:
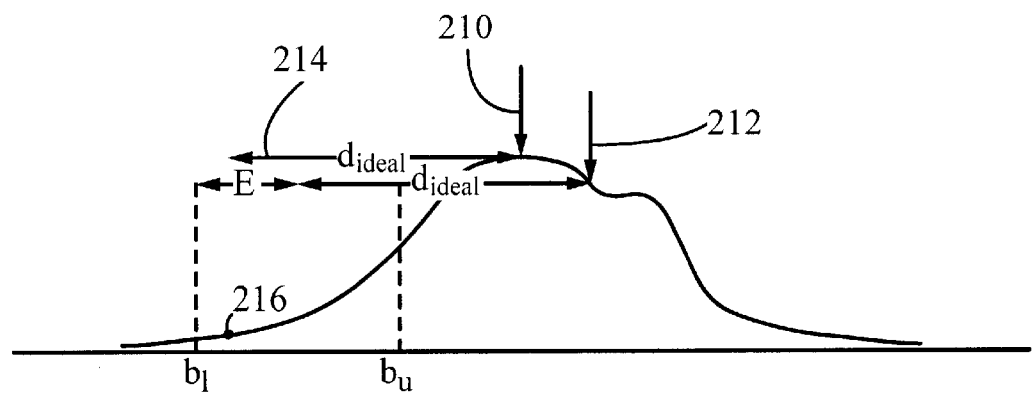

Initial values of lower and upper bounds $b_1$ and $b_u$ of the Fibonacci search interval, shown in FIG. 14C, are determined from the current position of the delay lock loop prompt correlator 212 (i.e., the midpoint between the early and late correlators), the range of expected multipath-induced tracking error E, and the ideal distance 214 between the multipath-invariant point 216 and DLL correlator 210 of the ideal autocorrelation function. Suitable values of the error E are obtained from known envelopes (FIG. 6) bounding the multipath tracking error of a standard DLL. For example, for a 0.5-chip spacing DLL and a signal-to-multipath ratio of 3 dB, multipath tracking error has a maximum range of approximately −50 m to +50 m, equivalent to 0.17 chips earlier and later than the ideal distance. The initial search interval bounds are computed as:

$b_1 = \tau_{prompt} - d_{ideal} - E$ and $b_u = \tau_{prompt} - d_{ideal} + E$, where $d_{ideal}$ is ideal distance 214, ±E is the tracking error, and $\tau_{prompt}$ is the actual location of the DLL prompt correlator 212, i.e., the point from which the ideal distance is measured.

In an alternative embodiment, a ratio of two correlator values is used instead of a difference between two values, i.e., instead of the discriminator function. In this embodiment, the ratio of two values is compared with a predetermined threshold value that indicates the location of the multipath-invariant point. The threshold value is typically different from a threshold value selected based on discriminator values; however, all other implementation details are the same. The Fibonacci search is performed using this ratio rather than the discriminator function. The reasoning behind the ratio is similar to the reasoning behind the discriminator function. Consider that each correlator function sample point is in the form Ax, where A is a multipath-dependent scale factor and x is a line-of-sight contribution. Since samples are taken in the multipath-invariant region, A is constant for all the samples. A ratio of two samples is therefore multipath independent and indicates the location of the point relative to the line-of-sight function.

Referring again to FIG. 13, the final result of the Fibonacci search is passed from optimizer 176 to filter 186. Because the Fibonacci search converges only after a prescribed number of iterations, the rate at which a solution is passed from optimizer 176 to filter 186 is much slower than the rate at which correlation function samples are obtained in discriminator module 172.

One drawback of this embodiment is the relatively long time required to initialize the MPI location process. Because each iteration of the Fibonacci search samples only one location of the correlation function, the MPI point and resulting tracking error value are only sufficiently accurate after a period of minutes. The Fibonacci search using the difference between values of the correlation function at two different points (late minus early) is the preferred embodiment for implementing the present invention on a low-end receiver in which only a single additional correlator pair is available. Other methods are preferable if additional hardware can be added to the receiver. In these embodiments, the correlation function is preferably sampled at multiple points to locate one or more multipath-invariant points. Additional hardware embodiments have the advantages of lower initialization time and/or higher accuracy.

Figure 15:
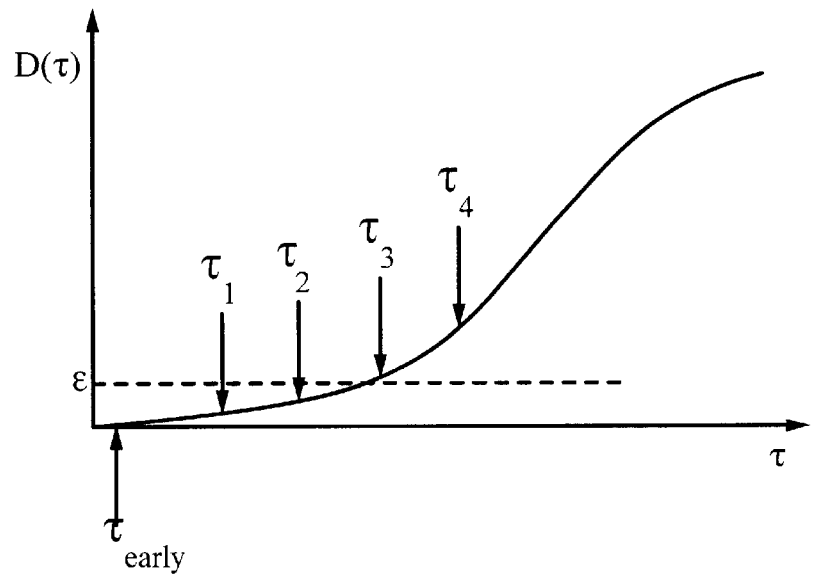
FIG. 15 illustrates a multiple correlator curve fit embodiment for locating a multipath-invariant point.

FIG. 15 illustrates a curve fit multiple correlator embodiment. As with the previous embodiment, it is to be understood that multiple correlator pairs represent either additional hardware or, in purely digital receivers, multiple sampling near the multipath-invariant point. In this embodiment, the correlation function is sampled at multiple early and late positions. If the correlators are separated by a fixed distance, then each of the early correlators is within a region that is unaffected by the main lobe of the line-of-sight correlation function. Alternatively, if samples can be acquired at arbitrary locations, then one early sample is taken and subtracted from each of the late samples to arrive at values of the discriminator function at each late sample time. FIG. 15 illustrates four different sample points, $\tau_1$ through $\tau_4$, although any number of sample points can be used. A curve fit is generated from either the sample points or the discriminator function. The point at which the curve fit is at the threshold value ε is considered to be the multipath-invariant point. If a sufficient number of correlators are provided, then no search is required, and the MPI point is located based on a single curve fit. In this case, continuous updates to the MPI point estimate can be made and smoothed over time. Note that this embodiment effectively acquires the same amount of information in one sampling time as the single-correlator pair embodiment acquires in four sampling times. That is, if each of points $\tau_1$ through $\tau_4$ requires sampling at a different time in the single-correlator embodiment, such an implementation will take at least 4 times as long to estimate the MPI point.

Figure 16:
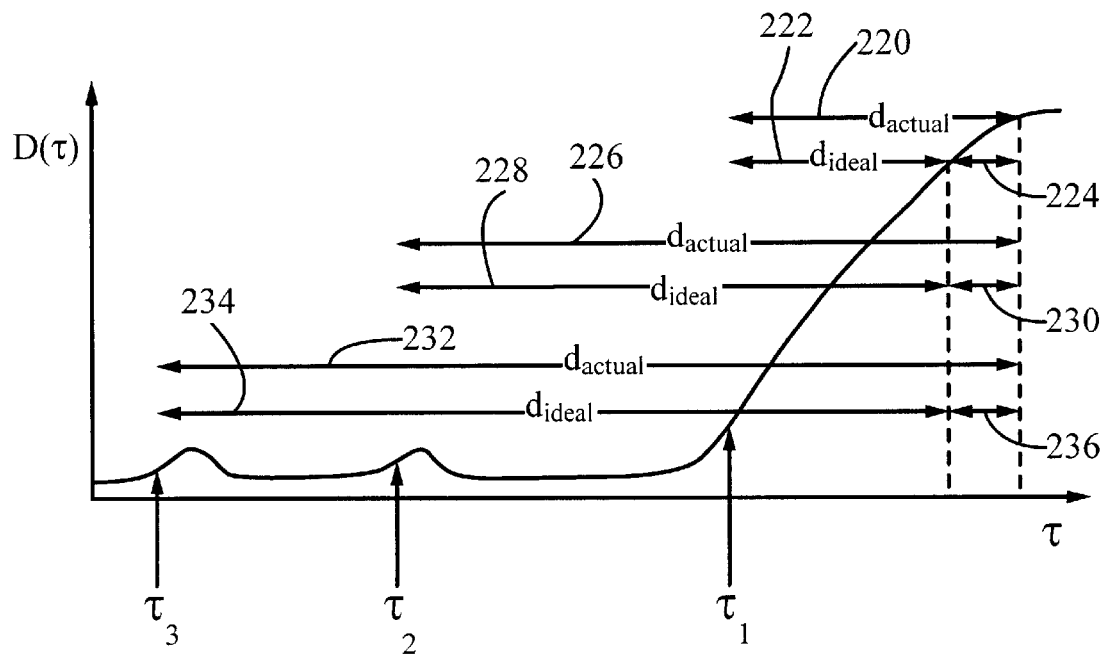
FIG. 16 illustrates a multiple correlator embodiment for locating multiple multipath-invariant points.

FIG. 16 illustrates an alternative multiple correlator embodiment. In this embodiment, the Fibonacci search algorithm is implemented for a single correlator pair located at each of a plurality of multipath-invariant points. For example, a first multipath-invariant point is located at an offset of $\tau_1$. The difference between an actual distance 220 and an ideal distance 222 is a tracking error 224. A second multipath-invariant point is located at an offset of $\tau_2$.

The difference between a second actual distance 226 and a second ideal distance 228 is a tracking error 230. A third multipath-invariant point is located at an offset of $\tau_3$. The difference between a third actual distance 232 and a third ideal distance 234 is a tracking error 236. In theory, as illustrated in FIG. 16, all errors 224, 230, and 236 have the same value. In principal, however, if one of the multipath invariant points is not located correctly, there is a small variation in the errors. Individual tracking errors 224, 230, and 236 are averaged to obtain an overall tracking error that is used to correct the pseudorange. One advantage of this embodiment is an improvement in the accuracy of the average tracking error compared with individual tracking errors derived from a single multipath-invariant point. Assuming the optimization errors are randomly distributed about the true MPI point location, they can be reduced by a factor of the number of MPI correlator pairs per channel. A second advantage is that the individual MPI estimates can be improved by using the code phase differences between MPI correlators. These differences are affected by the TrEC implementation bias errors (discussed below) only. Comparing all code phase offsets allows outliers to be discovered and removed. This embodiment is implemented either by using additional hardware or by sampling the correlation function at locations near each multipath-invariant point.

The two multiple-correlator embodiments can also be combined by using multiple correlators to sample each of a number of different MPI points.

Figure 17:
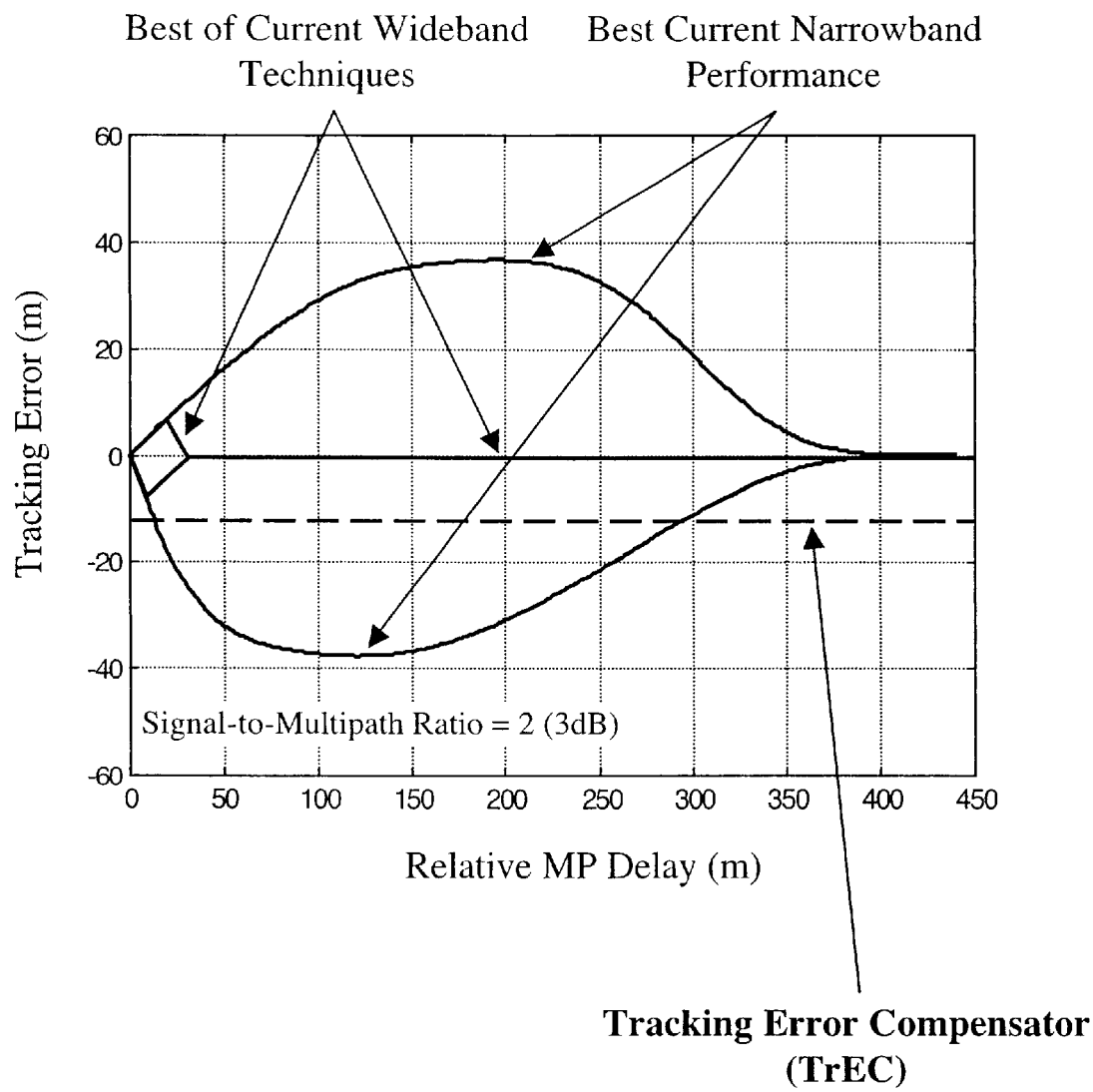
FIG. 17 is a plot of tracking error versus multipath delay for conventional narrowband and wideband multipath mitigation techniques and for a method of the invention.

The multipath mitigation method of the present invention has been implemented using signal generators with known multipath delays and using actual satellites. In all cases, the mean tracking error is reduced significantly. FIG. 17 shows theoretical multipath performance of the present invention, as well as existing narrowband and wideband techniques, implemented on a 2 MHz PCB receiver with a signal-to-multipath ratio of 3 dB. Note that unlike the performance envelopes for existing techniques, tracking error of the present invention displays a constant bias. It is constant because the multipath error that occurs with the present invention is not a function of multipath parameters. The bias results from the finite PCB of the receiver and the selection (location) of the desired MPI point. TrEC bias errors, which appear as relatively small variations about this constant bias, result from a combination of five factors:

1. Optimization tolerance. The Fibonacci search converges on the MPI point within a predetermined tolerance. Without noise, the error can be made arbitrarily small; with noise, however, the tolerance must be increased to provide reasonable initialization times.
2. Thermal noise. Low signal power in the MPI region makes thermal noise significant. The biases are higher for low signal power, low-elevation satellites and with large search intervals. Long integration times decrease the effect of thermal noise.
3. Very short delay multipath.
4. Amplitude variations.
5. Ionospheric divergence rate. Low-elevation satellites cause the largest errors, which are magnified by long integration times and long-term smoothing.

One way to remove these biases is by additional hardware (e.g., wider receiver precorrelation bandwidth or more correlators). In addition, because the tracking error bias is multipath independent, its value can be determined once and then used to correct subsequent solutions. Various methods can be used to determine the bias. For example, the frequency band limiting effects of a particular receiver can be modeled using a PCB filter model, and the resultant bias in the tracking error from these effects can be determined. Alternatively, the bias can be found directly by using a GPS signal generator or pseudolite. Provided the receiver's conventional DLL is not corrupted by multipath, the bias can be computed as simply the mean difference between the ideal, infinite bandwidth distance and the measured distance to the MPI point. The computed bias is then added to subsequent tracking error measurements.

Note that changes in the satellite signal power change the amplitude of the correlation function and the location at which the selected threshold value occurs. This causes the filter bias to be different for each satellite. Because the received signal power is a function of the satellite elevation angle, the correlation peak is also elevation dependent. This effect can be eliminated by normalizing the correlation function. Preferably, the Fibonacci search is performed using a normalized correlation function. A normalized MPI discriminator $D'(\epsilon)$ is given by:

$$D'(\varepsilon) \approx \frac{\frac{\sum (I_{l,mpi} - I_{e,mpi})}{\frac{1}{2}\sum (Q_{l,mpi} + Q_{e,mpi})}}{\frac{\sum I_P}{\sum Q_P}},$$

where $\Sigma(I_{l,mpi} - I_{e,mpi})$ is the integrated mean difference of the late and early in-phase samples in the MPI region, $\frac{1}{2}\Sigma(Q_{l,mpi}+Q_{e,mpi})$ is the accumulated late and early quadrature samples, $I_P$ is the in-phase prompt measurement obtained at the DLL, and $Q_P$ is the quadrature prompt measurement obtained at the DLL.

If the signals are accordingly normalized, not only is the tracking error bias independent of multipath parameters such as amplitude, phase, and delay, it may also be independent of PRN code. That is, the bias is constant across all receiver channels for all LOS signal variations. This provides effective normalization with respect to signal power variations, provided the multipath and the LOS signal attenuation effects can be modeled as simple amplitude scale factors. This also assumes the accumulated quadrature samples, $\Sigma Q_P$ and $\frac{1}{2}\Sigma(Q_{l,mpi}+Q_{e,mpi})$, are nonrandom and possess nonzero mean.

With a constant PCB filter (and MPI point location) bias, even though the bias affects the individual pseudorange measurements, its effect can be removed from the final position solution. If the bias is the same across channels, it becomes part of the clock bias in the final GPS position solution.

The filter bias can also be reduced through calibration by removing the elevation angle dependence of the received signal power. Beam shaping of the transmitted GPS signal has a relatively minor effect, causing the line-of-sight signal power to vary by only 2–3 dB as a function of elevation angle. The dominant factor causing variation is the antenna gain pattern, which varies widely for different antenna types. Once known, the elevation angle dependence is removed by adjusting the MPI tracking threshold as a function of satellite elevation angle and, if the pattern is not symmetric, azimuth. Calibration is simply experimental determination of a scale factor $a(\theta_{elev})$ such that $a(\theta_{elev})=A^k$ for k ranging over all satellites, where A is the line-of-sight signal amplitude. The calibration-normalized discriminator function is the discriminator function scaled by $a(\theta_{elev})$, with the threshold scaled similarly.

Cross-channel smoothing (CCS) is a technique for reducing the TrEC bias errors and can be used to reduce the individual pseudorange biases. In CSS, the tracking errors are averaged across all receiver channels. If the nominal TrEC correction for the $k^{th}$ pseudorange at time $t_j$ is defined as $\Psi^k(t_j)$, a modified, cross-channel smoothed TrEC correction, $\Psi^k_{xc}(t_j)$, may then be defined as:

$$\Psi^k_{xc}(t_j) = \Psi^k(t_j) + \left(\overline{\Psi}(t_j) - \hat{\Psi}^k(t_j)\right),$$

where:

$$\overline{\Psi}(t_j) = \frac{1}{K}\sum_{k=1}^{K} \hat{\Psi}^k(t_j)$$

is the average of all K original TrEC corrections at time $t_j$. $\hat{\Psi}^k(t_j)$ represents the time-averaged (Hatch-filtered) estimate of the $k^{th}$ TrEC corrections at time $t_j$. Cross-channel smoothing effectively reduces the maximum TrEC bias errors by a factor of the number of TrEC-enabled channels on a GPS receiver. As a consequence of this, however, the TrEC corrections become multipath varying, and the maximum expected multipath error increases. This trade-off, however, is acceptable in many instances where small mean errors are most desirable. Cross-channel smoothing may not be necessary if more MPI correlators and/or a wider PCB is available.

While the invention has been described with respect to correlation function slope as the multipath-invariant property, other multipath-invariant properties may exist. Appropriate changes to the algorithm are required to locate multipath-invariant points that are characterized by different properties. It will be apparent to one of average skill in the art how to implement the necessary changes.

It is believed that the present invention provides one of the few multipath mitigation techniques that are effective in narrow precorrelation bandwidth receivers. Is it therefore possible that the invention will be implemented on a widespread basis. If so, it will be helpful to use code sequences that are optimal for locating multipath-invariant points. Optimal codes (e.g., m-sequences) have autocorrelation functions with long multipath-invariant regions adjacent to the main lobe.

While the present invention has been described primarily for use in mitigating multipath, it can be used for detecting and eliminating tracking error caused by any source. An analogous algorithm is used, with multipath-invariant points replaced by points that are distortion invariant, i.e., that have a property that is independent of parameters of the signal distortion. One important application is integrity monitoring, i.e., monitoring the integrity of the transmitted signals to detect signal anomalies. In high-precision GPS applications such as landing aircraft, a very high integrity of the transmitted signal is required. Satellite signal anomalies result from a failure of the signal generating hardware on one of the GPS space vehicles (SVs). For example, a failure of SV19 occurred in October 1993 and caused pseudorange errors on the order of 3 to 8 meters, which is much too large for aircraft conducting a precision approach. The signal integrity is monitored independently of its direct use for navigation, and detected errors in signal transmission are removed from the position estimate.

Signal transmission failures distort the correlation peak in a manner similar to the effect of multipath. Rather than a multipath-invariant point, however, points that are insensitive to satellite failure are first located on the ideal autocorrelation function. During operation, these points are located in the received correlation function using methods identical to those described above for locating multipath-invariant points. The difference of the distances between the ideal and actual failure-insensitive points and the DLL loop is used as either an indicator of signal failure or as compensation for tracking error caused by signal failure. These points may or may not be coincident with MPI points.

Another important application of the invention is mitigating tracking error caused by noise in the received code. Multipath-invariant points are also insensitive to code noise. In fact, experiments performed by the present inventor indicate that the invention is capable of eliminating both multipath tracking error and code noise tracking error. In practice, it is not necessary to separate the two effects, as the effect on the correlation peak is qualitatively the same. For systems in which significant multipath is not present, the present invention can be implemented for code noise tracking error reduction alone. Implementation is identical to that described above. The chief advantage comes from the dynamic decoupling enabled by the (low-noise) carrier phase tracking. Tracking the MPI point corrects for any code tracking biases, while the relatively stable carrier dynamics effectively cancel the random noise errors.

In applications in which multipath is not the primary source of code tracking error, the distortion-invariant point may be located at the late (i.e., right) side of a peak or side lobe of the correlation function. While multipath distorts the late side of peaks, other error sources distort the early side of the peak. For example, signal transmission errors may cause signal anomalies known as evil waveforms. One type of evil waveform, Threat Model A of the full ICAO second-order step threat models, is a lead/lag model that may cause signal distortions that lead the signal. In this case, the distortion-invariant point is at the late side of peaks.

The present invention may be implemented to use either a combination of correlators (e.g., using cross-correlation properties) or a specially-designed non-replica code function to alter the received correlation function. Sampling with such codes may change the characteristics of the correlation function, thereby providing additional signal power for more robust solutions in the presence of noise. Such technology is used in other multipath mitigation techniques and can be applied to the present invention. For example, the Strobe Correlator is described in L. Garin and J. -M. Rousseau, "Enhanced Strobe Correlator Multipath Mitigation for Code and Carrier," *Proceedings of the $10^{th}$ International Technical Meeting of the Satellite Division of the Institute of Navigation*, Vol. 1, pp. 559–568, 1997.

Improved (loop-filter) estimation algorithms may assist in achieving faster, more robust convergence to the MPI point. A traditional Hatch filter was assumed for the TrEC implementation described above; however, using SNR, elevation angle, and other signal observables in an adaptive estimator or Kalman filter may provide even more effective TrEC corrections. The model equations for these additions are available in the prior art and are not described herein. In the context of the present invention, these error estimates are applied in combination with the TrEC estimates, which may be particularly useful when hardware is limited and when CCS is necessary. It is to be understood that the combination of multipath-invariant point location according to the present invention with prior art multipath estimation techniques is within the scope of the present invention.

For GPS signals, the ionosphere typically causes the code signal to diverge from the carrier. This limits the time that carrier phase propagation (or dynamic decoupling) can be used in single-frequency receivers. Dual-frequency measurements can be used, however, to estimate this rate of divergence. In GPS, this rate information may be obtained from dual-frequency receivers or from WAAS (Wide Area Augmentation System) receivers. If this rate is available, it may be used directly to correct the carrier propagation rate and accordingly permit longer sample averaging times and/or longer propagation times.

It will be clear to one skilled in the art that the above embodiments may be altered in many ways without departing from the scope of the invention. Accordingly, the scope of the invention should be determined by the following claims and their legal equivalents.

What is claimed is:

1. A method for mitigating the effect of multipath signals on envelope tracking of a primary signal by a spread-spectrum receiver, wherein said primary signal comprises a carrier signal modulated by an envelope, and wherein a received signal comprises said multipath signals and said primary signal, said method comprising:

a) locating an ideal multipath-invariant point in an ideal comparison function, thereby determining an ideal distance between said ideal multipath-invariant point and an ideal multipath-dependent point, wherein said ideal comparison function is computed from an ideal signal that does not comprise multipath signals;

b) correlating to step (a), locating a corresponding multipath-invariant point in an actual comparison function, thereby determining an actual distance between said corresponding multipath-invariant point and a corresponding multipath-dependent point, wherein said actual comparison function is computed from said received signal;

c) comparing said ideal distance and said actual distance; and d) based on said comparing in step (c), mitigating the effect of said multipath signals on said envelope tracking of said primary signal.

2. The method of claim 1 wherein step (c) comprises subtracting said ideal distance from said actual distance to obtain a tracking error.

3. The method of claim 2 wherein step (d) comprises adjusting a computed pseudorange by said tracking error, wherein said pseudorange is computed in dependence on said envelope tracking and represents a distance between said receiver and a signal transmitter.

4. The method of claim 2, further comprising removing a bias in said tracking error.

5. The method of claim 2 wherein said receiver further tracks a plurality of additional received signals, and wherein said method further comprises:

performing steps (a), (b), and (c) for each additional received signal to obtain a plurality of additional tracking errors; and averaging said tracking error and said plurality of additional tracking errors to obtain an average tracking error.

6. The method of claim 1 wherein step (d) comprises controlling a signal tracking loop that tracks said received signal.

7. The method of claim 1 wherein said ideal multipath-invariant point is in a plateau of said ideal comparison function.

8. The method of claim 7 wherein said ideal multipath-invariant point is at an edge of said plateau.

9. The method of claim 1 wherein said ideal multipath-invariant point is adjacent to a plateau of said ideal comparison function.

10. The method of claim 1 wherein said corresponding multipath-dependent point is a point sampled by a signal tracking loop that tracks said received signal.

11. The method of claim 1 wherein step (b) comprises:

bounding an interval containing said corresponding multipath-invariant point, wherein bounds of said interval are selected in dependence on theoretical tracking errors and on said ideal distance; and narrowing said interval until said corresponding multipath-invariant point is located.

12. The method of claim 11 wherein narrowing said interval comprises performing a modified Fibonacci search.

13. The method of claim 1 wherein step (b) comprises sampling said actual comparison function at least one point to obtain at least a first sample.

14. The method of claim 13 wherein sampling said actual comparison function comprises eliminating an effect of dynamics of a signal tracking loop on said at least one point using a low-distortion component of said received signal.

15. The method of claim 14 wherein said low-distortion component of said received signal is said carrier signal.

16. The method of claim 14, further comprising estimating a rate of divergence of said signal tracking loop from said low-distortion component.

17. The method of claim 16 wherein estimating said rate of divergence comprises obtaining dual-frequency measurements of said received signal.

18. The method of claim 13 wherein step (b) further comprises sampling said actual comparison function to obtain at least a second sample.

19. The method of claim 18 wherein step (b) further comprises:

subtracting said first sample from said second sample to obtain a discriminator value; and comparing said discriminator value with a predetermined threshold value.

20. The method of claim 19 wherein said first sample is not affected by a main lobe of a primary signal comparison function.

21. The method of claim 19, further comprising repeating said sampling, subtracting, and comparing steps at different locations until said discriminator value is sufficiently close to said threshold value.

22. The method of claim 18 wherein step (b) further comprises:

forming a ratio between said first sample and said second sample; and comparing said ratio with a predetermined threshold value.

23. The method of claim 18 wherein step (b) further comprises estimating a shape of said actual comparison function from at least said first sample and said second sample and locating said corresponding multipath-invariant point in dependence on said shape.

24. The method of claim 1, further comprising:

locating one or more additional ideal multipath-invariant points in said ideal comparison function, thereby determining one or more additional ideal distances between said one or more additional ideal multipath-invariant points and said ideal multipath-dependent point; and locating one or more additional corresponding multipath-invariant points in said actual comparison function, thereby determining one or more additional actual distances between said one or more additional corresponding multipath-invariant points and said corresponding multipath-dependent point.

25. The method of claim 24, further comprising comparing said one or more additional ideal distances and said one or more additional actual distances.

26. The method of claim 24, further comprising comparing said actual distance and said one or more additional actual distances.

27. The method of claim 1, further comprising repeating step (b) at a later time to obtain a plurality of additional actual distances, and averaging said actual distance and said plurality of additional actual distances to obtain an average actual distance.

28. The method of claim 1 wherein said actual comparison function is further computed from a function that is not a replica of said received signal.

29. The method of claim 1, further comprising calibrating said actual comparison function in dependence on an elevation angle of a signal transmitter.

30. The method of claim 1, further comprising normalizing said actual comparison function.

31. The method of claim 1 wherein said receiver is a Global Positioning System (GPS) receiver.

32. A method for measuring a tracking error generated by a spread-spectrum receiver tracking a received signal comprising an envelope modulating a carrier signal, said method, comprising:
   a) locating an ideal distortion-invariant point in an ideal comparison function, thereby determining an ideal distance between said ideal distortion-invariant point and an ideal distortion-dependent point, wherein said ideal comparison function is computed from an ideal signal that is not distorted;
   b) correlating to step (a), locating a corresponding distortion-invariant point in an actual comparison function, thereby determining an actual distance between said corresponding distortion-invariant point and a corresponding distortion-dependent point, wherein said actual comparison function is computed from said received signal, wherein said received signal is at least partially distorted; and
   c) subtracting said ideal distance from said actual distance to obtain said tracking error.

33. The method of claim 32, further comprising using said tracking error to improve tracking performance of said receiver.

34. The method of claim 32, wherein said tracking error is caused by a failure in transmission of said received signal, and wherein said distortion-invariant point has a property that is unaffected by said failure.

35. The method of claim 32, wherein said tracking error is caused by noise in said received signal, and wherein said distortion-invariant point has a property that is unaffected by said noise.

36. The method of claim 32, further comprising using said tracking error to improve tracking of a different received signal by said receiver.

37. The method of claim 32, further comprising removing a bias in said tracking error.

38. The method of claim 32, further comprising calibrating said actual comparison function in dependence on an elevation angle of a signal transmitter.

39. The method of claim 32, further comprising normalizing said actual comparison function.

40. The method of claim 32 wherein step (b) further comprises eliminating an effect of dynamics of a signal tracking loop on locating said distortion-invariant point.

41. The method of claim 40 wherein said effect is eliminated using a low-distortion component of said received signal.

42. The method of claim 41 wherein said low-distortion component of said signal is said carrier signal.

43. The method of claim 42, further comprising estimating a rate of divergence of said signal tracking loop from said low-distortion component.

44. The method of claim 43 wherein estimating said rate of divergence comprises obtaining dual-frequency measurements of said received signal.

45. The method of claim 32 wherein said receiver further tracks a plurality of additional received signals, and wherein said method further comprises:
   performing steps (a), (b), and (c) for each additional received signal to obtain a plurality of additional tracking errors; and
   averaging said tracking error and said plurality of additional tracking errors to obtain an average tracking error.

* * * * *